(12) United States Patent
Liu et al.

(10) Patent No.: US 9,954,223 B2
(45) Date of Patent: Apr. 24, 2018

(54) FABRICATION METHODS FOR BATTERIES

(71) Applicant: Verily Life Sciences LLC, Mountain View, CA (US)

(72) Inventors: Zenghe Liu, Alameda, CA (US); Brian Otis, Sunnyvale, CA (US); William Biederman, Fox Island, WA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 15/673,393

(22) Filed: Aug. 9, 2017

(65) Prior Publication Data
US 2017/0338484 A1    Nov. 23, 2017

Related U.S. Application Data

(63) Continuation of application No. 14/143,697, filed on Dec. 30, 2013, now Pat. No. 9,761,874.

(51) Int. Cl.
| | |
|---|---|
| *H01M 10/0525* | (2010.01) |
| *H01M 4/46* | (2006.01) |
| *H01M 12/06* | (2006.01) |
| *H01M 4/92* | (2006.01) |
| *H01M 12/08* | (2006.01) |
| *G02C 7/04* | (2006.01) |

(52) U.S. Cl.
CPC ............... *H01M 4/46* (2013.01); *H01M 4/92* (2013.01); *H01M 12/06* (2013.01); *H01M 12/08* (2013.01); *G02C 7/04* (2013.01); *H01M 2220/30* (2013.01); *H01M 2300/0085* (2013.01); *Y02E 60/128* (2013.01)

(58) Field of Classification Search
CPC .................. H01M 10/0525; H01M 10/058
See application file for complete search history.

(56) References Cited

U.S. PATENT DOCUMENTS

| | | | |
|---|---|---|---|
| 5,981,107 | A | 11/1999 | Hamano et al. |
| 8,380,290 | B2 | 2/2013 | Scarantino et al. |
| 8,562,801 | B2 | 10/2013 | Boeck et al. |
| 2005/0051427 | A1 | 3/2005 | Brauker et al. |
| 2007/0059459 | A1 | 3/2007 | Yang |
| 2007/0260171 | A1 | 11/2007 | Higuchi et al. |
| 2009/0045055 | A1 | 2/2009 | Rhodes et al. |
| 2012/0162600 | A1 | 6/2012 | Pugh et al. |
| 2012/0245444 | A1 | 9/2012 | Otis et al. |

(Continued)

FOREIGN PATENT DOCUMENTS

| | | |
|---|---|---|
| JP | 2011-524611 | 1/2011 |
| WO | WO 2013/149181 | 10/2013 |

OTHER PUBLICATIONS

International Search Report and Written Opinion prepared by the Korean Patent Office in International Patent Application Serial No. PCT/US2014/072520 dated Apr. 13, 2015.

*Primary Examiner* — Olatunji Godo
(74) *Attorney, Agent, or Firm* — McDonnell Boehnen Hulbert & Berghoff LLP

(57) ABSTRACT

A method may involve forming a first electrode on a structure, where the first electrode defines an anode of a battery, and where the battery is configured to provide electrical power to a circuit located on the structure. The method may further involve forming a second electrode on the structure, where the second electrode defines a cathode of the battery, and where the second electrode is configured to reduce oxygen. And the method may involve embedding the structure in a polymer.

20 Claims, 11 Drawing Sheets

(56) References Cited

U.S. PATENT DOCUMENTS

2013/0316253 A1 11/2013 Barde et al.
2013/0323610 A1 12/2013 Kim et al.
2015/0188197 A1 7/2015 Liu

FABRICATION METHODS FOR BATTERIES

CROSS-REFERENCE TO RELATED APPLICATION

This application is a continuation of application Ser. No. 14/143,697, filed Dec. 30, 2013, which is incorporated herein by reference.

BACKGROUND

Unless otherwise indicated herein, the materials described in this section are not prior art to the claims in this application and are not admitted to be prior art by inclusion in this section.

A body-mountable device may be configured to monitor health-related information based on at least one analyte from a user. For example, a bio-compatible device may be embedded in a polymer to provide the body-mountable device. The bio-compatible device includes a sensor configured to detect the at least one analyte (e.g., glucose) in a fluid of a user wearing the body-mountable device. The body-mountable device may also be configured to monitor various other types of health-related information.

SUMMARY

In one aspect, a method involves: forming a first electrode on a structure, where the first electrode defines an anode of a battery, and where the battery is configured to provide electrical power to a circuit located on the structure; forming a second electrode on the structure, where the second electrode defines a cathode of the battery, and where the second electrode is configured to reduce oxygen; and embedding the structure in a polymer.

In another aspect, a device is disclosed. The device includes a first polymer layer defining a first side of the device; a second polymer layer defining a second side of the device; and a structure between the first and second polymer layers, where the structure comprises: a first electrode, where the first electrode defines an anode of a battery, where the battery is configured to provide electrical power to a circuit located on the structure, and a second electrode, where the second electrode defines a cathode of the battery, and where the second electrode is configured to reduce oxygen.

In yet another aspect, a system is disclosed. The system includes: means for forming a first electrode on a structure, where the first electrode defines an anode of a battery, and where the battery is configured to provide electrical power to a circuit located on the structure; means for forming a second electrode on the structure, where the second electrode defines a cathode of the battery, and where the second electrode is configured to reduce oxygen; and means for embedding the structure in a polymer.

These as well as other aspects, advantages, and alternatives, will become apparent to those of ordinary skill in the art by reading the following detailed description, with reference where appropriate to the accompanying drawings.

DETAILED DESCRIPTION

Figure 1:
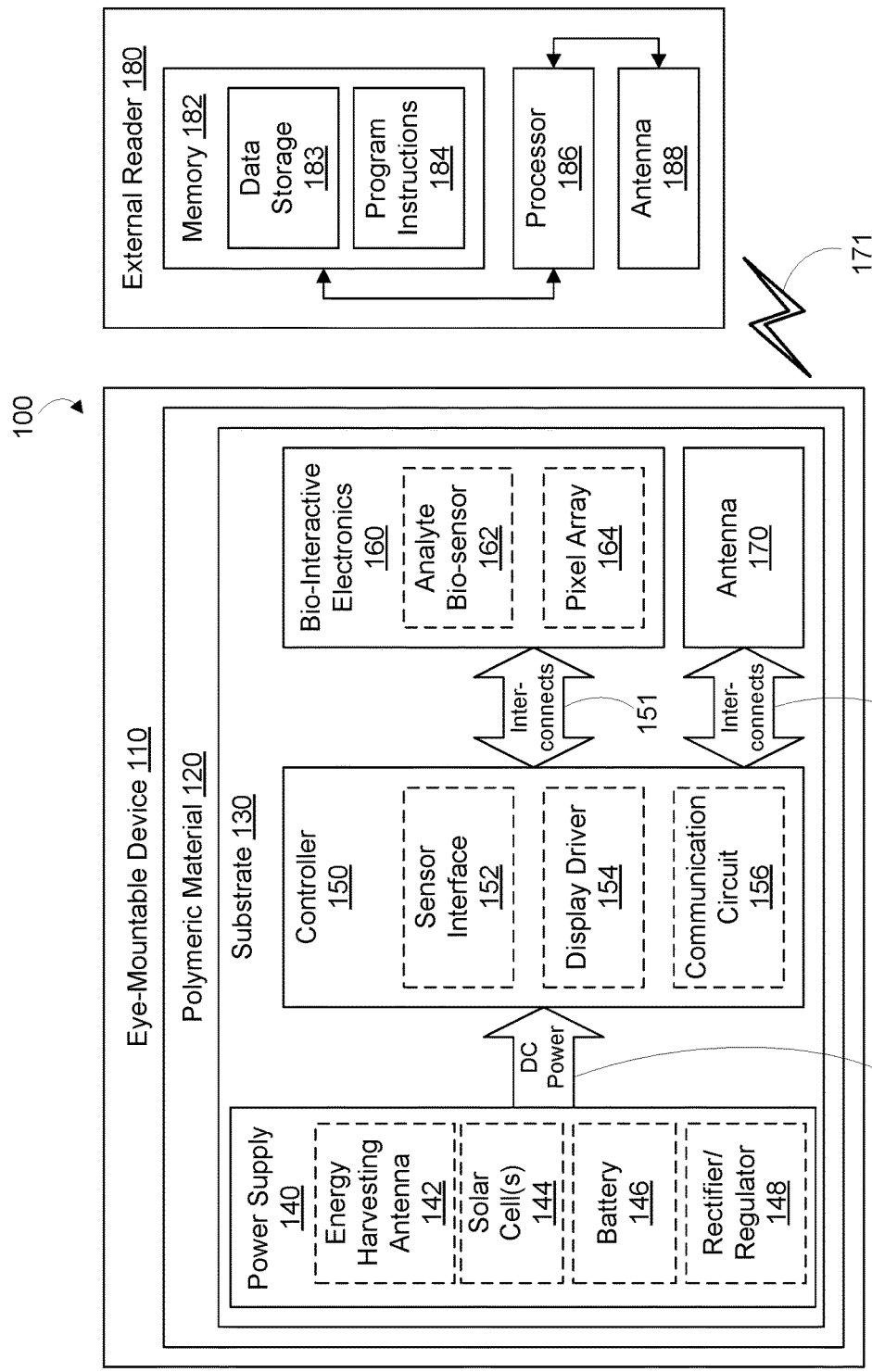
FIG. 1 is a block diagram of a system with an eye-mountable device in wireless communication with an external reader, according to an example embodiment.

The following detailed description describes various features and functions of the disclosed methods and systems with reference to the accompanying figures. In the figures, similar symbols typically identify similar components, unless context dictates otherwise. The illustrative method and system embodiments described herein are not meant to be limiting. It will be readily understood that certain aspects of the disclosed methods and systems can be arranged and combined in a wide variety of different configurations, all of which are contemplated herein.

I. INTRODUCTION

A body-mountable device may be configured to monitor health-related information based on at least one analyte detected in a fluid of a user wearing the body-mountable device. Such a body-mountable device may include a structure embedded in a polymer that includes a sensor configured to detect the at least one analyte.

The structure may further include a circuit and a battery. The battery may be configured to provide electrical power to the circuit. Beneficially, the battery may reduce or eliminate the need for one or more power scavenging systems on the structure, such as an energy harvesting antenna that may capture energy from incident radio frequency radiation or one or more solar cells that may capture energy from incoming ultraviolet, visible, and/or infrared radiation. With this arrangement, the battery may permit autonomous operation of the body-mountable device.

For example, the circuit may include an electrochemical sensor and potentiostat, and the battery may bias the electrochemical sensor via the potentiostat. As another example, the circuit may include a memory and the battery may power the memory for data logging of sensor readings. The battery may also be configured to provide electrical power to a variety of other circuits that may be located on the structure, such as a computation circuit, a communication circuit, and/or a display circuit. Further, in some implementations, the battery may be configured to provide electrical power to one or more low-power circuits.

In addition, the battery may also be configured to provide electrical power to other components located on the structure. As one example, the battery may be configured to provide electrical power to one or more indicators located on the structure, such a pixel array. With this arrangement, the one or more indicators may be configured to provide feedback to a wearer of the body-mountable device. As another example, the battery may be configured to provide electrical power to a camera and/or a video camera that may be located on the structure. Further, in some implementations, the battery may be configured to provide electrical power to one or more peripheral components.

Disclosed herein are fabrication methods for batteries that may be included in the body-mountable device. Beneficially, embodiments described herein may provide batteries that may be biocompatible and nontoxic. Further, embodiments described herein may provide batteries that may be flexible and may conform to the structure.

II. EXAMPLE SYSTEMS AND DEVICES

An example body-mountable device that comprises an eye-mountable device that is configured to detect at least one analyte in a tear film of a user wearing the eye-mountable device will now be described in greater detail.

A structure in accordance with an exemplary embodiment may include a sensor, electronics, a battery, and an antenna all situated on a substrate. The battery may be configured to provide electrical power to the electronics. And the electronics may operate the sensor to perform readings and operate the antenna to wirelessly communicate the readings from the sensor to an external reader via the antenna. The sensor can be arranged on the substrate to face outward, away from the corneal surface of the user, so as to generate clinically relevant readings from tear fluid of the user that the sensor receives via a channel in the anterior side of the eye-mountable device. For example, the sensor can be suspended in the lens material and situated such that the sensor is less than 10 micrometers from the anterior edge of the eye-mountable device. The sensor can generate an output signal indicative of a concentration of an analyte that the sensor receives via the channel.

FIG. 1 is a block diagram of a system 100 with an eye-mountable device 110 in wireless communication with an external reader 180. The exposed regions of the eye-mountable device 110 are made of a polymeric material 120 formed to be contact-mounted to a corneal surface of an eye. In accordance with the exemplary methods, polymeric material 120 may comprise a first polymer layer and a second polymer layer.

Substrate 130 is embedded in the polymeric material 120 to provide a mounting surface for a power supply 140, a controller 150, bio-interactive electronics 160, and an antenna 170. The bio-interactive electronics 160 are operated by the controller 150. The power supply 140 supplies operating voltages to the controller 150 and/or the bio-interactive electronics 160. The antenna 170 is operated by the controller 150 to communicate information to and/or from the eye-mountable device 110. The antenna 170, the controller 150, the power supply 140, and the bio-interactive electronics 160 can all be situated on the embedded substrate 130. Because the eye-mountable device 110 includes electronics and is configured to be contact-mounted to an eye, it may also be referred to as an ophthalmic electronics platform.

To facilitate contact-mounting, the polymeric material 120 can have a concave surface configured to adhere ("mount") to a moistened corneal surface (e.g., by capillary forces with a tear film coating the corneal surface). Additionally or alternatively, the eye-mountable device 110 can be adhered by a vacuum force between the corneal surface and the polymeric material due to the concave curvature. While mounted with the concave surface against the eye, the anterior or outward-facing surface of the polymeric material 120 can have a convex curvature that is formed to not interfere with eye-lid motion while the eye-mountable device 110 is mounted to the eye. For example, the polymeric material 120 can be a substantially transparent curved polymeric disk shaped similarly to a contact lens.

The polymeric material 120 can include one or more biocompatible materials, such as those employed for use in contact lenses or other ophthalmic applications involving direct contact with the corneal surface. The polymeric material 120 can optionally be formed in part from such biocompatible materials or can include an outer coating with such biocompatible materials. The polymeric material 120 can include materials configured to moisturize the corneal surface, such as hydrogels and the like. In some instances, the polymeric material 120 can be a deformable ("non-rigid") material to enhance wearer comfort. In some instances, the polymeric material 120 can be shaped to provide a predetermined, vision-correcting optical power, such as can be provided by a contact lens.

The substrate 130 includes one or more surfaces suitable for mounting the bio-interactive electronics 160, the controller 150, the power supply 140, and the antenna 170. The substrate 130 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) can be patterned on the substrate 130 to form circuitry, electrodes, etc. For example, the antenna 170 can be formed by depositing a pattern of gold or another conductive material on the substrate 130. Similarly, interconnects 151, 157 between the controller 150 and the bio-interactive electronics 160, and between the controller 150 and the antenna 170, respectively, can be formed by depositing suitable patterns of conductive materials on the substrate 130. A combination of resists, masks, and deposition techniques can be employed to pattern materials on the substrate 130.

The substrate 130 can be a relatively rigid polymeric material, such as PET, paralyene or another material sufficient to structurally support the circuitry and/or electronics within the polymeric material 120. The eye-mountable device 110 can alternatively be arranged with a group of unconnected substrates rather than a single substrate. For example, the controller 150 and a bio-sensor or other bio-interactive electronic component can be mounted to one substrate, while the antenna 170 is mounted to another substrate and the two can be electrically connected via the interconnects 157.

In some embodiments, the bio-interactive electronics 160 (and the substrate 130) can be positioned away from the center of the eye-mountable device 110 and thereby avoid interference with light transmission to the eye through the center of the eye-mountable device 110. For example, where the eye-mountable device 110 is shaped as a concave-curved disk, the substrate 130 can be embedded around the periphery (e.g., near the outer circumference) of the disk. In some embodiments, the bio-interactive electronics 160 (and the substrate 130) can be positioned in the center region of the eye-mountable device 110. The bio-interactive electronics 160 and/or the substrate 130 can be substantially transparent to incoming visible light to mitigate interference with light transmission to the eye. Moreover, in some embodiments, the bio-interactive electronics 160 can include a pixel array 164 that emits and/or transmits light to be perceived by the eye according to display driver instructions. Thus, the bio-interactive electronics 160 can optionally be positioned in the center of the eye-mountable device so as to generate perceivable visual cues to a wearer of the eye-mountable device 110, such as by displaying information via the pixel array 164.

The substrate 130 can be shaped as a flattened ring with a radial width dimension sufficient to provide a mounting platform for the embedded electronics components. The substrate 130 can have a thickness sufficiently small to allow the substrate 130 to be embedded in the polymeric material 120 without influencing the profile of the eye-mountable device 110. The substrate 130 can have a thickness sufficiently large to provide structural stability suitable for supporting the electronics mounted thereon. For example, the substrate 130 can be shaped as a ring with a diameter of about 10 millimeters, a radial width of about 1 millimeter (e.g., an outer radius 1 millimeter larger than an inner radius), and a thickness of about 50 micrometers. The substrate 130 can optionally be aligned with the curvature of the anterior side of the eye-mountable device 110.

The power supply 140 is configured to power the controller 150 and bio-interactive electronics 160. For example, a radio-frequency energy harvesting antenna 142 can capture energy from incident radio radiation. Additionally or alternatively, solar cell(s) 144 ("photovoltaic cells") can capture energy from incoming ultraviolet, visible, and/or infrared radiation. Furthermore, an inertial power scavenging system can be included to capture energy from ambient vibrations. The energy harvesting antenna 142 can optionally be a dual-purpose antenna that is also used to communicate information to the external reader 180. That is, the functions of the antenna 170 and the energy harvesting antenna 142 can be accomplished with the same physical antenna.

In addition, the power supply 140 may include a battery 146. The battery 146 may comprise an electrolyte and two electrodes, an anode and a cathode. Electrochemical reactions between the anode and the electrolyte and between the electrolyte and the cathode can cause the development of an electrical potential between the electrodes. Further, the battery 146 may comprise a solid-state device. In some examples, the battery 146 may be a re-chargeable battery. In other examples, the battery 146 may be a single-use battery. In some examples, the battery 146 may be connected to the controller 150 and/or the antenna 170 via interconnects (not shown).

A rectifier/regulator 148 can be used to condition the captured energy to a stable DC supply voltage 141 that is supplied to the controller 150. For example, the energy harvesting antenna 142 can receive incident radio frequency radiation. Varying electrical signals on the leads of the antenna 142 are output to the rectifier/regulator 148. The rectifier/regulator 148 rectifies the varying electrical signals to a DC voltage and regulates the rectified DC voltage to a level suitable for operating the controller 150. Additionally or alternatively, output voltage from the solar cell(s) 144 can be regulated to a level suitable for operating the controller 150. The rectifier/regulator 148 can include one or more energy storage devices arranged to mitigate high frequency variations in the ambient energy harvesting antenna 142 and/or solar cell(s) 144. For example, an energy storage device (e.g., capacitor, inductor, etc.) can be connected to the output of the rectifier/regulator 148 so as to function as a low-pass filter. In addition, the rectifier/regulator 148 could provide a DC supply voltage 141 from the battery 146. In some embodiments, the rectifier/regulator 148 could generate a voltage used to recharge the battery 146. With this arrangement, captured energy from the energy-harvesting antenna 142, solar cell(s), and/or the inertial power scavenging system may be used to recharge the battery 146.

The controller 150 is turned on when the DC supply voltage 141 is provided to the controller 150, and the logic in the controller 150 operates the bio-interactive electronics 160 and the antenna 170. The controller 150 can include logic circuitry configured to operate the bio-interactive electronics 160 so as to interact with a biological environment of the eye-mountable device 110. The interaction could involve the use of one or more components, such as an analyte bio-sensor 162, in bio-interactive electronics 160 to obtain input from the biological environment. Alternatively or additionally, the interaction could involve the use of one or more components, such as the pixel array 164, to provide an output to the biological environment.

In one example, a sensor interface module 152 can be included for operating the analyte bio-sensor 162. The analyte bio-sensor 162 can be, for example, an amperometric electrochemical sensor that includes a working electrode and a reference electrode. Application of an appropriate voltage between the working and reference electrodes can cause an analyte to undergo electrochemical reactions (e.g., reduction and/or oxidation reactions) at the working electrode to generate an amperometric current. The amperometric current can be dependent on the analyte concentration, and thus the amount of amperometric current can provide an indication of analyte concentration. In some embodiments, the sensor interface module 152 can be a potentiostat configured to apply a voltage difference between the working and reference electrodes while measuring a current through the working electrode.

In some instances, a reagent can also be included to sensitize the electrochemical sensor to desired analytes. For example, a layer of glucose oxidase ("GOX") can be situated around the working electrode to catalyze glucose into hydrogen peroxide ($H_2O_2$). The hydrogen peroxide can then be oxidized at the working electrode, which releases electrons to the working electrode, which generates a current.

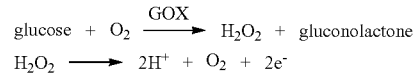

The current generated by either reduction or oxidation reactions can be approximately proportionate to the reaction rate. Further, the reaction rate can be dependent on the rate of analyte molecules reaching the electrochemical sensor electrodes to fuel the reduction or oxidation reactions, either directly or catalytically through a reagent. In a steady state, where analyte molecules diffuse to the electrochemical sensor electrodes from a sampled region at approximately the same rate that additional analyte molecules diffuse to the sampled region from surrounding regions, the reaction rate can be approximately proportionate to the concentration of the analyte molecules. The current can thus provide an indication of the analyte concentration.

The controller 150 can optionally include a display driver module 154 for operating the pixel array 164. The pixel array 164 can be an array of separately programmable light transmitting, light reflecting, and/or light emitting pixels arranged in rows and columns. The individual pixel circuits can optionally include liquid crystal technologies, micro-electromechanical technologies, emissive diode technologies, etc. to selectively transmit, reflect, and/or emit light according to information from the display driver module 154. Such a pixel array 164 can also optionally include more than one color of pixels (e.g., red, green, and blue pixels) to render visual content in color. The display driver module 154 can include, for example, one or more data lines providing programming information to the separately programmed pixels in the pixel array 164 and one or more addressing lines for setting groups of pixels to receive such programming information. Such a pixel array 164 situated on the eye can also include one or more lenses to direct light from the pixel array to a focal plane perceivable by the eye. In some embodiments, the battery 146 may be configured to provide electrical power to the pixel array 164.

The controller 150 can also include a communication circuit 156 for sending and/or receiving information via the antenna 170. The communication circuit 156 can optionally include one or more oscillators, mixers, frequency injectors, etc. to modulate and/or demodulate information on a carrier frequency to be transmitted and/or received by the antenna 170. In some examples, the eye-mountable device 110 is configured to indicate an output from a bio-sensor by modulating an impedance of the antenna 170 in a manner that is perceivable by the external reader 180. For example, the communication circuit 156 can cause variations in the amplitude, phase, and/or frequency of backscatter radiation from the antenna 170, and such variations can be detected by the external reader 180.

The controller 150 is connected to the bio-interactive electronics 160 via interconnects 151. For example, where the controller 150 includes logic elements implemented in an integrated circuit to form the sensor interface module 152 and/or display driver module 154, a patterned conductive material (e.g., gold, platinum, palladium, titanium, copper, aluminum, silver, metals, combinations of these, etc.) can connect a terminal on the chip to the bio-interactive electronics 160. Similarly, the controller 150 is connected to the antenna 170 via interconnects 157.

It is noted that the block diagram shown in FIG. 1 is described in connection with functional modules for convenience in description. However, embodiments of the eye-mountable device 110 can be arranged with one or more of the functional modules ("sub-systems") implemented in a single chip, integrated circuit, and/or physical feature. For example, while the rectifier/regulator 148 is illustrated in the power supply block 140, the rectifier/regulator 148 can be implemented in a chip that also includes the logic elements of the controller 150 and/or other features of the embedded electronics in the eye-mountable device 110. Thus, the DC supply voltage 141 that is provided to the controller 150 from the power supply 140 can be a supply voltage that is provided on a chip by rectifier and/or regulator components of the same chip. That is, the functional blocks in FIG. 1 shown as the power supply block 140 and controller block 150 need not be implemented as separated modules. Moreover, one or more of the functional modules described in FIG. 1 can be implemented by separately packaged chips electrically connected to one another.

Additionally or alternatively, the energy harvesting antenna 142 and the antenna 170 can be implemented with the same physical antenna. For example, a loop antenna can both harvest incident radiation for power generation and communicate information via backscatter radiation.

The external reader 180 includes an antenna 188 (or group of more than one antennae) to send and receive wireless signals 171 to and from the eye-mountable device 110. The external reader 180 also includes a computing system with a processor 186 in communication with a memory 182. The memory 182 is a non-transitory computer-readable medium that can include, without limitation, magnetic disks, optical disks, organic memory, and/or any other volatile (e.g., RAM) or non-volatile (e.g., ROM) storage system readable by the processor 186. The memory 182 can include a data storage 183 to store indications of data structures, such as sensor readings (e.g., from the analyte bio-sensor 162), program settings (e.g., to adjust behavior of the eye-mountable device 110 and/or external reader 180), etc. The memory can also include program instructions 184 for execution by the processor 186 to cause the external reader to perform processes specified by the program instructions 184. For example, the program instructions 184 can cause external reader 180 to provide a user interface that allows for retrieving information communicated from the eye-mountable device 110 (e.g., sensor outputs from the analyte bio-sensor 162). The external reader 180 can also include one or more hardware components for operating the antenna 188 to send and receive the wireless signals 171 to and from the eye-mountable device 110. For example, oscillators, frequency injectors, encoders, decoders, amplifiers, filters, etc. can drive the antenna 188 according to instructions from the processor 186.

The external reader 180 can be a smart phone, digital assistant, or other portable computing device with wireless connectivity sufficient to provide the wireless communication link 171. The external reader 180 can also be implemented as an antenna module that can be plugged into a portable computing device, such as in an example where the communication link 171 operates at carrier frequencies not commonly employed in portable computing devices. In some instances, the external reader 180 is a special-purpose device configured to be worn relatively near a wearer's eye to allow the wireless communication link 171 to operate with a low power budget. For example, the external reader 180 can be integrated in eyeglasses, integrated in a piece of jewelry such as a necklace, earing, etc., or integrated in an article of clothing worn near the head, such as a hat, headband, etc.

In an example where the eye-mountable device 110 includes an analyte bio-sensor 162, the system 100 can be operated to monitor the analyte concentration in tear film on the surface of the eye. Thus, the eye-mountable device 110 can be configured as a platform for an ophthalmic analyte bio-sensor. The tear film is an aqueous layer secreted from the lacrimal gland to coat the eye. The tear film is in contact with the blood supply through capillaries in the structure of the eye and includes many biomarkers found in blood that are analyzed to characterize a person's health condition(s). For example, the tear film includes glucose, calcium, sodium, cholesterol, potassium, other biomarkers, etc. The biomarker concentrations in the tear film can be systematically different than the corresponding concentrations of the biomarkers in the blood, but a relationship between the two concentration levels can be established to map tear film biomarker concentration values to blood concentration levels. For example, the tear film concentration of glucose can be established (e.g., empirically determined) to be approximately one tenth the corresponding blood glucose concentration. Thus, measuring tear film analyte concentration levels provides a non-invasive technique for monitoring biomarker levels in comparison to blood sampling techniques performed by lancing a volume of blood to be analyzed outside a person's body. Moreover, the ophthalmic analyte bio-sensor platform disclosed here can be operated substantially continuously to enable real time monitoring of analyte concentrations.

To perform a reading with the system 100 configured as a tear film analyte monitor, the external reader 180 can emit radio frequency radiation 171 that is harvested to power the eye-mountable device 110 via the power supply 140. Radio frequency electrical signals captured by the energy harvesting antenna 142 (and/or the antenna 170) are rectified and/or regulated in the rectifier/regulator 148 and a regulated DC supply voltage 147 is provided to the controller 150. The radio frequency radiation 171 thus turns on the electronic components within the eye-mountable device 110. Once turned on, the controller 150 operates the analyte bio-sensor 162 to measure an analyte concentration level. For example, the sensor interface module 152 can apply a voltage between a working electrode and a reference electrode in the analyte bio-sensor 162 sufficient to cause the analyte to undergo an electrochemical reaction at the working electrode. The current through the working electrode can be measured to provide the sensor output indicative of the analyte concentration. The controller 150 can operate the antenna 170 to communicate the sensor results back to the external reader 180 (e.g., via the communication circuit 156). The sensor result can be communicated by, for example, modulating an impedance of the antenna 170 such that the modulation in impedance is detected by the external reader 180. The modulation in antenna impedance can be detected by, for example, backscatter radiation from the antenna 170.

In some embodiments, the system 100 can operate to non-continuously ("intermittently") supply energy to the eye-mountable device 110 to power the on-board controller 150 and electronics 160. For example, radio frequency radiation 171 can be supplied to power the eye-mountable device 110 long enough to carry out a tear film analyte concentration measurement and communicate the results. For example, the supplied radio frequency radiation can provide sufficient power to charge two electrodes to a potential sufficient to induce electrochemical reactions, measure the resulting amperometric current, and modulate the antenna impedance to adjust the backscatter radiation in a manner indicative of the measured current. In such an example, the supplied radio frequency radiation 171 can be considered an interrogation signal from the external reader 180 to the eye-mountable device 110 to request a measurement. By periodically interrogating the eye-mountable device 110 (e.g., by supplying radio frequency radiation 171 to temporarily turn the device on) and storing the sensor results (e.g., via the data storage 183), the external reader 180 can accumulate a set of analyte concentration measurements over time without continuously powering the eye-mountable device 110.

In addition, the radio frequency radiation 171 may be supplied to charge the battery 146. In some examples, the supplied radio frequency radiation 171 can charge the battery 146 long enough so that the battery 146 is fully charged. Further, in some examples, the supplied radio frequency radiation 171 can charge so that the battery 146 is less than fully charged.

Further, in some embodiments, the battery 146 may provide power to the controller 150 to operate the analyte bio-sensor 162 to measure an analyte concentration level. And in at least one such embodiment, the battery 146 may reduce or eliminate the need for continuous radio frequency radiation 171 from the external reader 180. With this arrangement, the battery 146 may permit autonomous operation of the eye-mountable device 110. For example, the battery 146 may bias the analyte bio-sensor 162, via a potentiostat, so that electrodes in the analyte bio-sensor 162 are at appropriate potentials for analyte measurement. As another example, the battery 146 may power a memory in the controller 150, for data logging of sensor readings from analyte bio-sensor 162.

Figure 2A:
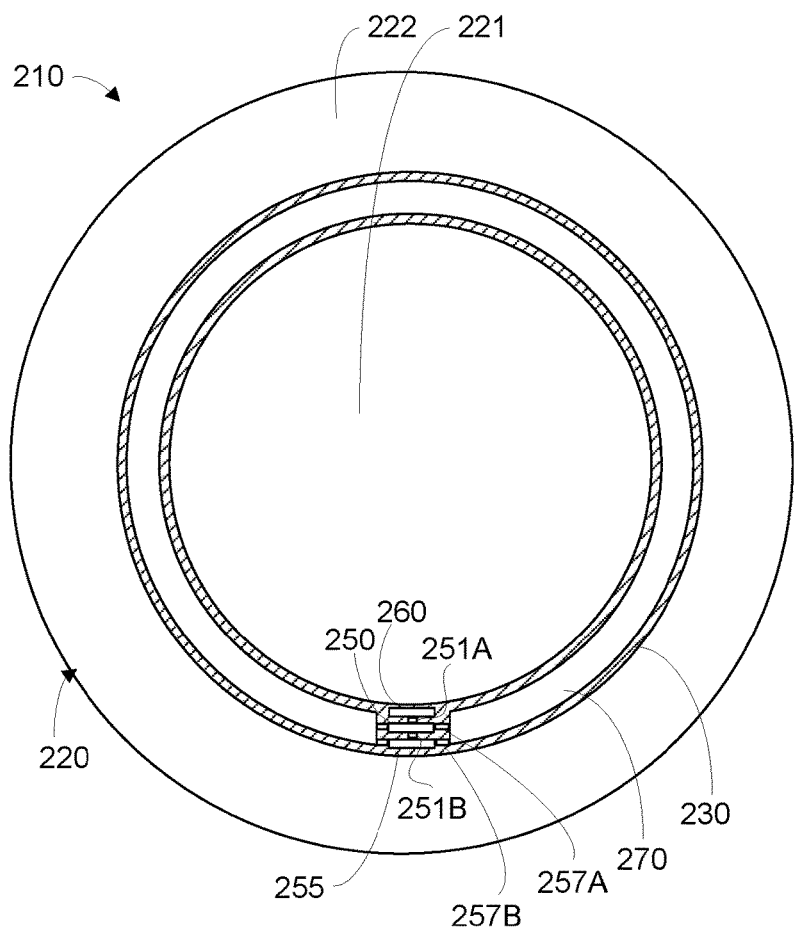
FIG. 2a is a top view of an eye-mountable device, according to an example embodiment.
Figure 2B:
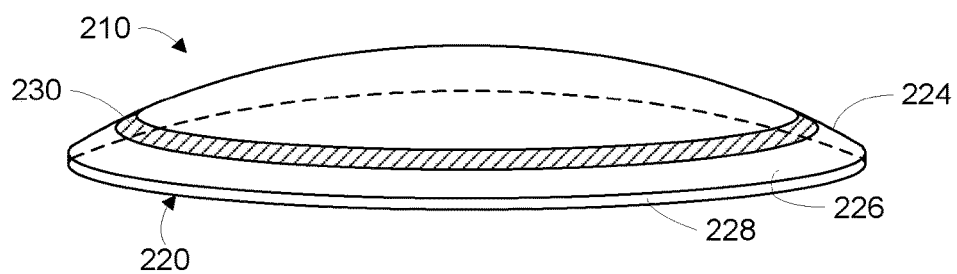
FIG. 2b is a side view of an eye-mountable device, according to an example embodiment.

FIG. 2a is a top view of an eye-mountable electronic device 210. FIG. 2b is a side view of the eye-mountable electronic device shown in FIG. 2a. It is noted that relative dimensions in FIGS. 2a and 2b are not necessarily to scale, but have been rendered for purposes of explanation only in describing the arrangement of the eye-mountable electronic device 210. The eye-mountable device 210 is formed of a polymeric material 220 shaped as a curved disk. The polymeric material 220 can be a substantially transparent material to allow incident light to be transmitted to the eye while the eye-mountable device 210 is mounted to the eye. The polymeric material 220 can be a biocompatible material similar to those employed to form vision correction and/or cosmetic contact lenses in optometry, such as PET, polymethyl methacrylate ("PMMA"), silicone hydrogels, combinations of these, etc. The polymeric material 220 can be formed with one side having a concave surface 226 suitable to fit over a corneal surface of an eye. The opposing side of the disk can have a convex surface 224 that does not interfere with eyelid motion while the eye-mountable device 210 is mounted to the eye. A circular outer side edge 228 connects the concave surface 224 and convex surface 226.

The eye-mountable device 210 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 210 can be selected according to the size and/or shape of the corneal surface and/or the scleral surface of the wearer's eye.

While the eye-mountable device 210 is mounted in an eye, the convex surface 224 (i.e., the anterior surface) faces outward to the ambient environment while the concave surface 226 (i.e., the posterior surface) faces inward, toward the corneal surface. The convex surface 224 can therefore be considered an outer, top surface of the eye-mountable device 210 whereas the concave surface 226 can be considered an inner, bottom surface. The "top" view shown in FIG. 2a is facing the convex surface 224.

A substrate 230 is embedded in the polymeric material 220. The substrate 230 can be embedded to be situated along the outer periphery 222 of the polymeric material 220, away from the center region 221. The substrate 230 does not interfere with vision because it is too close to the eye to be in focus and is positioned away from the center region 221 where incident light is transmitted to the light-sensing portions of the eye. Moreover, the substrate 230 can be formed of a transparent material to further mitigate any effects on visual perception.

The substrate 230 can be shaped as a flat, circular ring (e.g., a disk with a central hole). The flat surface of the substrate 230 (e.g., along the radial width) is a platform for mounting electronics such as chips (e.g., via flip-chip mounting) and for patterning conductive materials (e.g., via deposition techniques) to form electrodes, antenna(e), and/ or connections. The substrate 230 and the polymeric material 220 can be approximately cylindrically symmetric about a common central axis. The substrate 230 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only. The substrate 230 can be implemented in a variety of different form factors.

A loop antenna 270, a controller 250, a battery 255, and bio-interactive electronics 260 are disposed on the embedded substrate 230. The controller 250 can be a chip including logic elements configured to operate the bio-interactive electronics 260 and the loop antenna 270. The controller 250 is electrically connected to the loop antenna 270 by interconnects 257A also situated on the substrate 230. Similarly, the controller 250 is electrically connected to the bio-interactive electronics 260 by interconnects 251A.

The battery 255 may be configured to power the controller 250. The battery 255 may be electrically connected to the controller 250 by interconnects 251B. Further, in some such examples, the battery 255 may be electrically connected to the loop antenna 270 by interconnects 257B.

The interconnects 251A, 251B, 257A, and 257B, the loop antenna 270, the battery 255, and any conductive electrodes (e.g., for an electrochemical analyte bio-sensor, etc.) can be formed from conductive materials patterned on the substrate 230 by a process for precisely patterning such materials, such as deposition or lithography. The conductive materials patterned on the substrate 230 can be, for example, gold, platinum, palladium, titanium, carbon, aluminum, copper, silver, silver-chloride, and/or other materials.

Figure 2D:
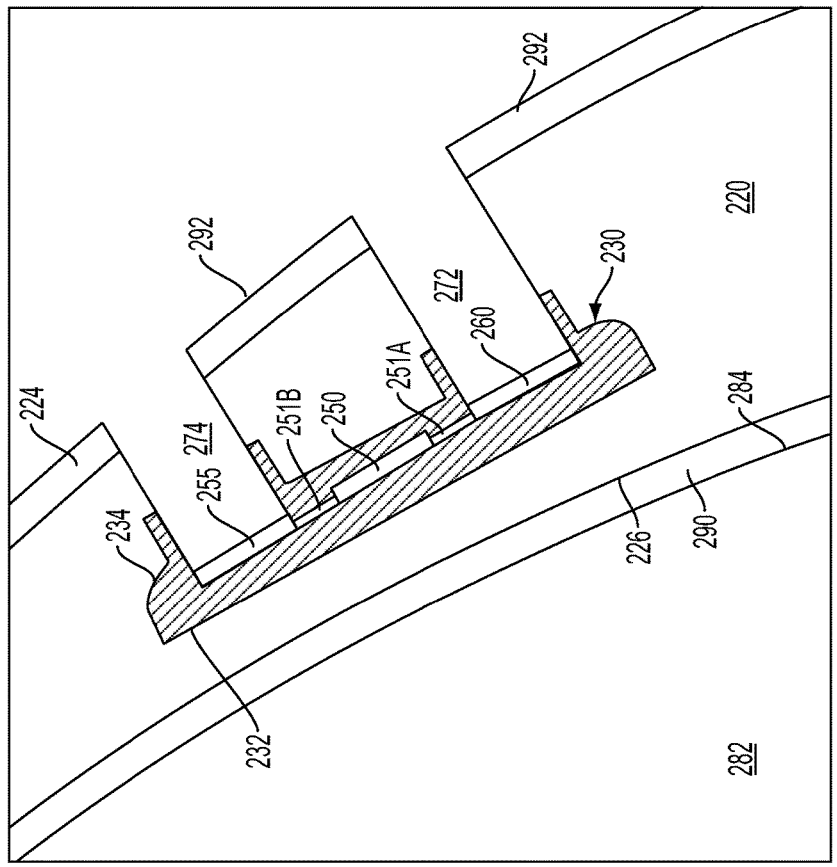
FIG. 2d is a side cross-section view showing the tear film layers surrounding the surfaces of the eye-mountable device mounted as shown in FIG. 2c, according to an example embodiment.
Figure 2C:
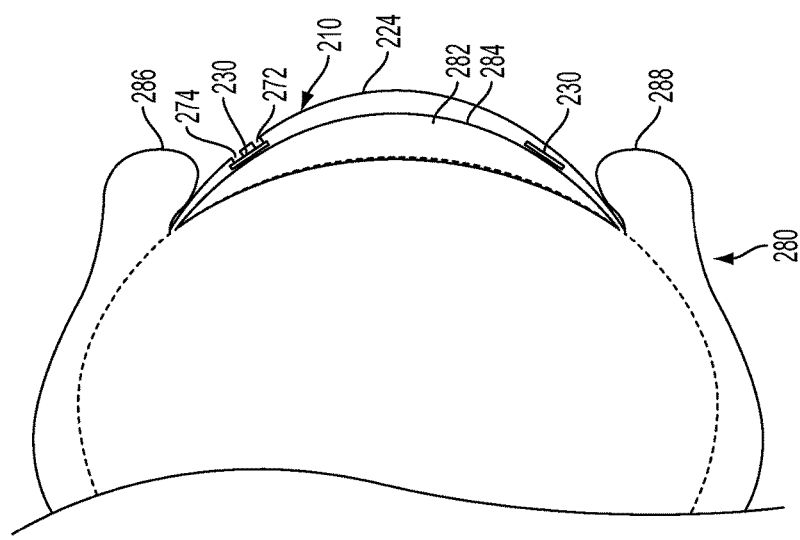
FIG. 2c is a side cross-section view of the eye-mountable device of FIG. 2a while mounted to a corneal surface of the eye, according to an example embodiment.

With reference to FIG. 2a, which is a view facing the convex surface 224 of the eye-mountable device 210, the bio-interactive electronics 260 is mounted to a side of the substrate 230 facing the convex surface 224. Where the bio-interactive electronics 260 includes an analyte bio-sensor, for example, mounting such a bio-sensor on the substrate 230 facing the convex surface 224 allows the bio-sensor to receive analyte concentrations in tear film through a channel 272 in the polymeric material 220 to the convex surface 224 (as illustrated in FIGS. 2c and 2d).

Similarly, as shown in FIG. 2a, the battery 255 is mounted to a side of the substrate 230 facing the convex surface 224. Where the battery 255 includes one or more electrodes that are configured to use as an electrolyte the tear film, mounting such a battery on the substrate 230 facing the convex surface 224 allows the battery 255 to receive the tear film through a channel 274 in the polymeric material 220 to the convex surface 224 (as illustrated in FIGS. 2c and 2d).

In some embodiments, some electronic components can be mounted on one side of the substrate 230, while other electronic components are mounted to the opposing side, and connections between the two can be made through conductive materials passing through the substrate 230.

The loop antenna 270 is a layer of conductive material patterned along the flat surface of the substrate to form a flat conductive ring. In some instances, the loop antenna 270 can be formed without making a complete loop. For instance, the loop antenna 270 can have a cutout to allow room for the controller 250, the battery 255, and the bio-interactive electronics 260, as illustrated in FIG. 2a. However, the loop antenna 270 can also be arranged as a continuous strip of conductive material that wraps entirely around the flat surface of the substrate 230 one or more times. For example, a strip of conductive material with multiple windings can be patterned on the side of the substrate 230 opposite the controller 250, the battery 255, and the bio-interactive electronics 260. Interconnects between the ends of such a wound antenna (e.g., the antenna leads) can be passed through the substrate 230 to the controller 250 and/or the battery 255. In some embodiments, the loop antenna can include a plurality of conductive loops spaced apart from each other, such as three conductive loops, five conductive loops, nine conductive loops, etc. With such an arrangement, the polymeric material 220 may extend between adjacent conductive loops in the plurality of conductive loops.

FIG. 2c is a side cross-section view of the eye-mountable electronic device 210 while mounted to a corneal surface 284 of an eye 280. FIG. 2d is a close-in side cross-section view enhanced to show tear film layers 290, 292 surrounding the exposed surfaces 224, 226 of the eye-mountable device 210. It is noted that relative dimensions in FIGS. 2c and 2d are not necessarily to scale, but have been rendered for purposes of explanation only in describing the arrangement of the eye-mountable electronic device 210. For example, the total thickness of the eye-mountable device 210 can be about 200 micrometers, while the thickness of the tear film layers 290, 292 can each be about 10 micrometers, although this ratio may not be reflected in the drawings. Some aspects are exaggerated to allow for illustration and facilitate explanation.

The eye 280 includes a cornea 282 that is covered by bringing the upper eyelid 286 and lower eyelid 288 together over the top of the eye 280. Incident light is received by the eye 280 through the cornea 282, where light is optically directed to light sensing elements of the eye 280 (e.g., rods and cones, etc.) to stimulate visual perception. The motion of the eyelids 286, 288 distributes a tear film across the exposed corneal surface 284 of the eye 280. The tear film is an aqueous solution secreted by the lacrimal gland to protect and lubricate the eye 280. When the eye-mountable device 210 is mounted in the eye 280, the tear film coats both the convex and concave surfaces 224, 226 with an inner layer 290 (along the concave surface 226) and an outer layer 292 (along the convex layer 224). The tear film layers 290, 292 can be about 10 micrometers in thickness and together account for about 10 microliters.

The tear film layers 290, 292 are distributed across the corneal surface 284 and/or the convex surface 224 by motion of the eyelids 286, 288. For example, the eyelids 286, 288 raise and lower, respectively, to spread a small volume of tear film across the corneal surface 284 and/or the convex surface 224 of the eye-mountable device 210. The tear film layer 290 on the corneal surface 284 also facilitates mounting the eye-mountable device 210 by capillary forces between the concave surface 226 and the corneal surface 284. In some embodiments, the eye-mountable device 210 can also be held over the eye in part by vacuum forces against the corneal surface 284 due to the concave curvature of the eye-facing concave surface 226.

As shown in the cross-sectional views in FIGS. 2c and 2d, the substrate 230 can be inclined such that the flat mounting surfaces of the substrate 230 are approximately parallel to the adjacent portion of the convex surface 224. As described above, the substrate 230 is a flattened ring with an inward-facing surface 232 (facing the concave surface 226 of the polymeric material 220) and an outward-facing surface 234 (facing the convex surface 224). The substrate 230 can have electronic components and/or patterned conductive materials mounted to either or both mounting surfaces 232, 234.

As shown in FIG. 2d, the bio-interactive electronics 260, the controller 250, the battery 255, and the conductive interconnects 251A and 251B are located between the outward-facing surface 234 and the inward-facing surface 232 such that the bio-interactive electronics 260 are facing the convex surface 224. As described above, the polymer layer defining the anterior side may be greater than 50 micrometers thick, whereas the polymer layer defining the posterior side may be less than 150 micrometers. Thus, the bio-interactive electronics 260 may be at least 50 micrometers away from the convex surface 224 and may be a greater distance away from the concave surface 226. However, in other examples, the bio-interactive electronics 260 may be mounted on the inward-facing surface 232 of the substrate 230 such that the bio-interactive electronics 260 are facing the concave surface 226. Similarly, in other examples, the battery 255 may be located on the inward-facing surface 232 or the outward-facing surface 234 of the structure 230. The bio-interactive electronics 260 and/or the battery 255 could also be positioned closer to the concave surface 226 than the convex surface 224. With this arrangement, the bio-interactive electronics 260 can receive analyte concentrations in the tear film 292 through the channel 272, and the battery 255 can receive tear film through the channel 274.

While the body-mountable device has been described as comprising the eye-mountable device 110 and/or the eye-mountable device 210, the body-mountable device could comprise other mountable devices that are mounted on or in other portions of the human body.

For example, in some embodiments, the body-mountable device may comprise a tooth-mountable device. In some embodiments, the tooth-mountable device may take the form of or be similar in form to the eye-mountable device 110 and/or the eye-mountable device 210. For instance, the tooth-mountable device could include a polymeric material and/or polymer that is the same as or similar to any of the polymeric materials or polymers described herein and a substrate and/or structure that is the same as or similar to any of the substrates or structures described herein. With such an arrangement, the tooth-mountable device may be configured to detect at least one analyte in a fluid (e.g., saliva) of a user wearing the tooth-mountable device.

Moreover, in some embodiments, the body-mountable device may comprise a skin-mountable device. In some embodiments, the skin-mountable device may take the form of or be similar in form to the eye-mountable device 110 and/or the eye-mountable device 210. For instance, the skin-mountable device could include a polymeric material and/or a polymer that is the same as or similar to any of the polymeric materials or polymers described herein and a substrate and/or structure that is the same as or similar to any of the substrates or structures described herein. With such an arrangement, the skin-mountable device may be configured to detect at least one analyte in a fluid (e.g., perspiration, blood, etc.) of a user wearing the skin-mountable device.

Further, some embodiments may include privacy controls which may be automatically implemented or controlled by the wearer of a body-mountable device. For example, where a wearer's collected physiological parameter data and health state data are uploaded to a cloud computing network for trend analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a body-mountable device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

II. EXAMPLE METHODS

Figure 3A:
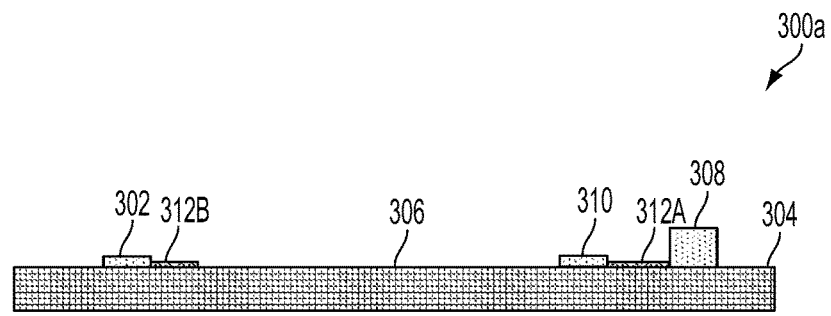
FIGS. 3a-d show stages of fabricating a battery, according to an example embodiment.
Figure 3B:
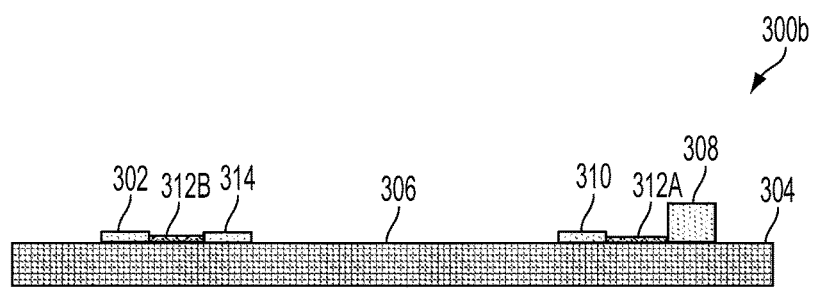
Figure 3C:
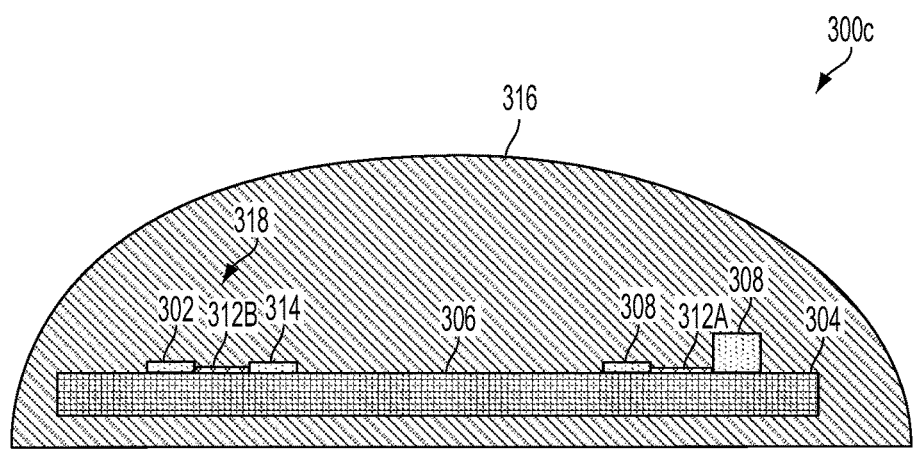
Figure 3D:
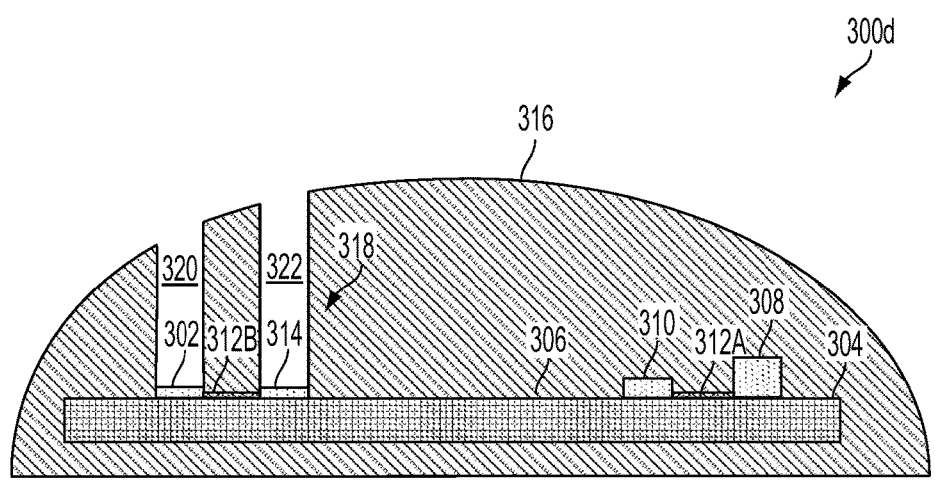

FIGS. 3a-d illustrate stages in a process for fabricating a battery, such as a battery 318 shown in FIGS. 3c and 3d. The illustrations shown in FIGS. 3a-d are generally shown in cross-sectional views to illustrate sequentially formed layers developed to create the battery. The layers can be developed by microfabrication and/or manufacturing techniques such as, for example, electroplating, photolithography, deposition, and/or evaporation fabrication processes and the like. The various materials may be formed according to patterns using photoresists and/or masks to pattern materials in particular arrangements. Additionally, electroplating techniques may also be employed to coat an arrangement of electrodes with a metallic plating. For example, an arrangement of conductive material formed by a deposition and/or photolithography process can be plated with a metallic material to create a conductive structure with a desired thickness. However, the dimensions, including relative thicknesses and widths, of the various layers illustrated and described in connection with FIGS. 3a-d to create the battery are not illustrated to scale. Instead, the drawings in FIGS. 3a-d schematically illustrate the ordering of the various layers for purposes of explanation only.

FIG. 3a illustrates forming a first electrode 302 on a structure 304 to provide a partially-fabricated device 300a. The first electrode 302 may define an anode of the battery 318.

The structure 304 may include a polymer 306 on which are formed a circuit 308, a sensor 310 and electrical interconnects 312A, 312B. The structure 304 may occupy a peripheral portion of a body-mountable device, such as body-mountable device 600 illustrated in FIG. 6. The polymer 306 may comprise a variety of polymeric materials, such as paralyene.

The circuit 308 can be configured in a variety of ways. As one example, the circuit 308 can comprise a chip including one or more logic elements configured to operate the sensor 310. Other configurations of the circuit 308 are possible as well.

The sensor 310 can be configured in a variety of ways. As one example, the sensor 310 may comprise a pair of electrodes, such as a working electrode and a reference electrode, configured to detect one or more analytes. Other configurations of the sensor 310 are possible as well. The sensor 310 can have a variety of thicknesses. As one example, the sensor 310 can have a thickness of 260 nanometers. Other thicknesses of the sensor 310 are possible as well.

The electrical interconnects 312A, 312B can be a variety of conductive materials configured to electrically connect the circuit 308, the sensor 310, and the battery 318. The electrical interconnects 312A, 312B may include one or more layers of platinum, silver, gold, palladium, titanium, copper, chromium, nickel, aluminum, other metals or conductive materials, and combinations thereof. In some embodiments, the electrical interconnects 312A, 312B may include a substantially transparent conductive material for at least some components (e.g., a material such as indium tin oxide).

The first electrode 302 may include a variety of materials. For example, the first electrode 302 may include at least one metal selected from the group consisting of zinc, iron, aluminum, an alloy that includes zinc and magnesium, an alloy that includes iron and magnesium, and alloy that includes aluminum and magnesium. In addition, the first electrode 302 may be formed in a variety of ways. For instance, first electrode 302 may be formed as described with reference to FIGS. 4a-d.

In the illustrated example, the first electrode 302 may be formed on the structure 304 when the structure 304 includes the circuit 308, the sensor 310, and the electrical interconnects 312A, 312B. However, in other examples, the first electrode 302 may be formed on the structure when the structure 304 may not include the circuit 308, the sensor 310, and/or the electrical interconnects 312A, 312B. As one example, the first electrode 302 may be formed on the structure 304 before the circuit 308 may be mounted to the structure 304. As another example, the first electrode 302 may be formed on the structure 304 before the sensor 310 may be formed on the structure 304. And as still another example, the first electrode 302 may be formed on the structure 304 before the electrical interconnects 312A, 312B may be formed on the structure 304.

FIG. 3b illustrates forming a second electrode 314 on the structure 304 to provide a partially-fabricated device 300b. The second electrode 314 may define a cathode of the battery 318. In addition, the second electrode 314 may be configured to reduce oxygen. In some examples, the reduced oxygen may be oxygen in the ambient air.

The second electrode 314 may include a variety of conductive materials. As one example, the second electrode 314 may include platinum. In addition, the second electrode 314 may be formed in a variety of ways. As one example, the second electrode 314 may be formed by a microfabrication process such as sputtering. However, in other examples, the second electrode 314 may be formed by another microfabrication process such as evaporation.

In the illustrated example, the second electrode 314 may be formed on the structure 304 when the structure 304 includes the circuit 308, the sensor 310, the electrical interconnects 312A, 312B, and the first electrode 302. However, in other examples, the second electrode 314 may be formed on the structure when the structure 304 may not include the circuit 308, the sensor 310, the electrical interconnects 312A, 312B, and/or the first electrode 302. As one example, the second electrode 314 may be formed on the structure 304 before the circuit 308 may be mounted to the structure 304. As another example, the second electrode 302 may be formed on the structure 304 before the sensor 310 may be formed on the structure 304. As still another example, the second electrode 314 may be formed on the structure 304 before the electrical interconnects 312A, 312B may be formed on the structure 304. And as yet another example, the second electrode 314 may be formed on the structure 304 before the first electrode 302 may be formed on the structure 304.

FIG. 3c illustrates embedding the structure 304 in a polymer 316 to provide a partially-fabricated device 300c. The structure 304 may be embedded in the polymer 316 in a variety of ways. As one example, the polymer 316 may be formed around the structure 304. With this arrangement, the polymer 316 may cover the circuit 308, the sensor 310, the electrical interconnects 312A, 312B the first electrode 302, and the second electrode 314.

The polymer 316 may include one or more polymer layers, such as one polymer layer or two polymer layers. Further, the polymer 316 may include a variety of materials. For example, the polymer 316 may include a silicone hydrogel, polyhydroxyethylmethacrylate, and/or a silicone hydrogel.

In some examples, the first electrode 302 and the second electrode 314 may be configured to use as an electrolyte fluid that has diffused into the polymer 316. For instance, when a body-mountable device includes the first electrode 302, the second electrode 314, and the polymer 316, the first electrode 302 and the second electrode 314 may each be configured to use as an electrolyte any bodily fluid of a wearer of the body-mountable device that has diffused into the polymer 316. And in some such examples, the polymer 316 may include a silicone hydrogel or polyhydroxyethylmethacrylate. With this arrangement, the battery 318 may include the first electrode 302, the second electrode 314, and the fluid that diffused into the polymer 318.

For example, when an eye-mountable device includes the first electrode 302, the second electrode 314, and the polymer 316, the first electrode 302 and the second electrode 314 may each be configured to use as an electrolyte tear fluid that has diffused into the polymer 316. As another example, when a tooth-mountable device includes the first electrode 302, the second electrode 314, and the polymer 316, the first electrode 302 and the second electrode 314 may each be configured to use as an electrolyte saliva that has diffused into the polymer 316. As yet another example, when a skin-mountable device includes the first electrode 302, the second electrode 314, and the polymer 316, the first electrode 302 and the second electrode 314 may each be configured to use as an electrolyte blood that has diffused into the polymer 316.

Further, in some examples, the first electrode 302 and the second electrode 314 may each be configured to use as an electrolyte fluid that contacts the first electrode 302 via one or more channels in the polymer 316 and the second electrode 314 via one or more other channels in the polymer 316. For instance, when a body-mountable device includes the first electrode 302, the second electrode 314, and the polymer 316, the first electrode 302 and the second electrode 314 may each be configured to use an electrolyte any bodily fluid of a wearer of the body-mountable device that contacts the first electrode 302 via one or more channels in the polymer 316 and the second electrode 314 via one or more other channels in the polymer 316. And in some such examples, the polymer 316 may include a silicone elastomer. With this arrangement, the battery 318 may include the first electrode 302, the second electrode 314, and the fluid that contacts the first electrode 302 via the one or more channels and the second electrode 314 via the one or more other channels.

For example, when an eye-mountable device includes the first electrode 302, the second electrode 314, and the polymer 316, the first electrode 302 and the second electrode 304 may each be configured to use as an electrolyte tear fluid that contacts the first electrode 302 via one or more channels in the polymer 316 and the second electrode 314 via one or more other channels in the polymer 316. As another example, when a tooth-mountable device includes the first electrode 302, the second electrode 314, and the polymer 316, the first electrode 302 and the second electrode 314 may each be configured to use an electrolyte saliva that contacts the first electrode 302 via one or more channels in the polymer 316 and the second electrode 314 via one or more other channels in the polymer 316. As yet another example, when a skin-mountable device includes the first electrode 302, the second electrode 314, and the polymer 316, the first electrode 302 and the second electrode 314 may each be configured to use an electrolyte blood that contacts the first electrode 302 via one or more channels in the polymer 316 and the second electrode 314 via one or more other channels in the polymer 316.

FIG. 3d illustrates forming a first channel 320 to the first electrode 302 through the polymer 316 and forming a second channel 322 to the second electrode 314 through the polymer 316 to provide a partially-fabricated device 300d. The first channel 320 could be formed in a variety of ways. As one example, the first channel 320 may be formed by removing material from the polymer 316. The material from the polymer 316 may be removed to form the first channel 320 in a variety of ways. For instance, the material from the polymer 316 may be removed to form the first channel 320 via process that includes drilling, ablation, etching, etc.

As another example, when embedding the structure 304 in the polymer 316 includes forming the polymer 316 around the structure 304, a mask layer may be formed over the first electrode 302 before forming the polymer 316 around the structure 304. With this arrangement, the polymer 316 may cover the mask layer. Further, in such an example, the mask layer may be removed to form the first channel 320 to the first electrode 302. The mask layer may be removed in a variety of ways. For instance, the mask layer may be removed via a process that includes etching the mask layer, dissolving the mask layer in a fluid, and/or soaking the mask layer in a fluid.

As still another example, when embedding the structure 304 in the polymer 316 includes forming the polymer 316 around the structure, the first channel 320 may be molded. For instance, the polymer 316 may be formed in a molding piece that includes a protrusion that extends from a surface of the molding piece to the first electrode 302 through the polymer 316 as the polymer 316 is being formed. With this arrangement, the protrusion may form the first channel 320 to the first electrode 302.

Similarly, the second channel 322 could be formed in a variety of ways. For instance, the second channel 322 may be formed by any techniques that may be used to form the first channel 320 described herein. In some examples, the second channel 322 may be formed by the same or similar technique that may be used to the first channel 320. However, in other examples, the second channel 322 may be formed by a different technique than the technique that may be used to form the first channel 320.

Although partially-fabricated device 300d has been described as forming a first channel 320 to the first electrode 302 and a second channel 322 to the second electrode 314, in other examples one channel may be formed to both the first electrode 302 and the second electrode 314. With this arrangement, a dimension of the one channel may be greater than or equal to a sum of a corresponding dimension of the first channel 320 and a corresponding dimension of the second channel 322. Such a channel may be formed by any of the techniques that may be used to form the first channel 320 and/or the second channel 322 described herein.

The battery 318 may be configured to provide electrical power to the circuit 308. When the first electrode 302 includes zinc, the following electrochemical reaction may occur at the first electrode 302:

$$Zn+H_2O \rightarrow ZnO+2H^++2e^-$$

In addition, the following electrochemical reaction may occur at the second electrode 314:

$$O_2+4e^-+4H^+ \rightarrow 2H_2O$$

As a result, a net chemical reaction of the battery 318 may be:

$$2Zn+O_2 \rightarrow 2ZnO$$

In some examples, one or more reaction products of the net chemical reaction of the battery 318 (e.g., zinc oxide) may be insoluble under physiological pH. As a result, at least one reaction product of the one or more reaction products of the battery 318 may not disperse into the fluid that the battery 318 may be configured to use as the electrolyte.

For example, when an eye-mountable device includes the battery 318, at least one reaction product of the one or more reaction products of the battery 318 may not disperse into the tear fluid of the wearer of the eye-mountable device. As another example, when a tooth-mountable device includes the battery 318, at least one reaction product of the one or more reaction products of the battery 318 may not disperse into the saliva of the wearer of the tooth-mountable device. As yet another example, when a skin-mountable device includes the battery 318, at least one reaction product of the one or more reaction products of the battery 318 may not disperse into the blood of the wearer of the skin-mountable device.

One or more components of the battery 318 may have a variety of sizes and thicknesses. In some examples, when an eye-mountable device includes the battery 318, the size and/or thicknesses of the one or more components may be selected based on increasing battery capacity while avoiding reducing a wearer's vision or comfort and avoiding reducing communication between an antenna (e.g., antenna 170 or loop antenna 270) and an external reader (e.g., external reader 180).

For example, when an eye-mountable device includes the battery 318, the size and/or thicknesses of the first electrode 302 and/or the second electrode 314 may be selected based on increasing battery capacity while avoiding reducing a wearer's vision or comfort and avoiding reducing communication between an antenna and an external reader. The size and/or thicknesses of the first electrode 302 and/or the second electrode 314 may be selected based on other parameters as well, such as the type or composition of the fluid that the first electrode 302 and the second electrode 304 may each be configured to use as an electrolyte and the type or properties of the material of the polymer 316.

As another example, when a skin-mountable device and/or a tooth-mountable device includes the battery 318, the size and/or thicknesses of the first electrode 302 and/or the second electrode 314 may be selected based on increasing battery capacity while avoiding reducing a wearer comfort and avoiding reducing communication between an antenna and an external reader. The size and/or thicknesses of the first electrode 302 and/or the second electrode 314 may be selected based on other parameters as well, such as the type or composition of the fluid that the first electrode 302 and the second electrode 314 may each be configured to use as an electrolyte and the type or properties of the material of the polymer 316.

Figure 4A:
FIGS. 4a-d show stages of forming an electrode, according to an example embodiment.
Figure 4B:
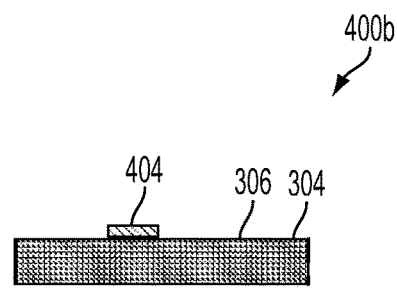
Figure 4C:
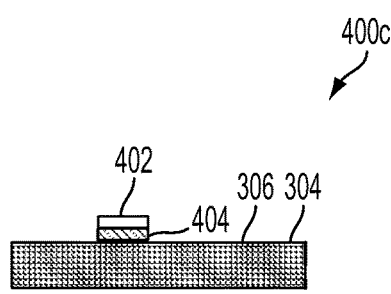
Figure 4D:
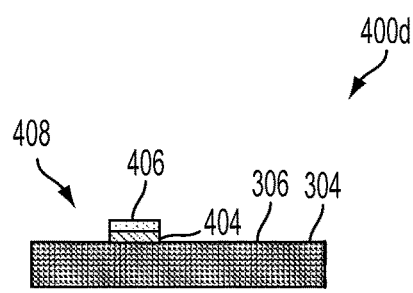

FIGS. 4a-d show stages of forming an electrode, such as an electrode 408 shown in FIG. 4d. The illustrations shown in FIGS. 4a-d are generally shown in cross-sectional views to illustrate sequentially formed layers to create the electrode. The layers can be developed by microfabrication and/or manufacturing techniques such as, for example, electroplating, photolithography, deposition, and/or evaporation fabrication processes and the like. The various materials may be formed according to patterns using photoresists and/or masks to pattern materials in particular arrangements. Additionally, electroplating techniques may also be employed to coat the electrode with a metallic plating. For example, an arrangement of conductive material formed by a deposition and/or photolithography process can be plated with a metallic material to create a conductive structure with a desired thickness. However, the dimensions, including relative thicknesses and widths, of the various layers illustrated and described in connection with FIGS. 4a-d to create the electrode are not illustrated to scale. Instead, the drawings in FIGS. 4a-d schematically illustrate the ordering of the various layers for purposes of explanation only.

FIG. 4a illustrates forming a mixture 402. The mixture 402 may include a metal powder, a photopolymerizable monomer crosslinker, and a photoinitiator. In some examples, the mixture 402 may comprise an ink.

The metal powder may take various different forms in various different embodiments. For example, the metal powder may be in micro or nano form. In addition, the metal powder could include a variety of materials. For example, the metal powder may include at least one metal selected from the group consisting of zinc, iron, aluminum, an alloy that includes zinc and magnesium, an alloy that includes iron and magnesium, and alloy that includes aluminum and magnesium.

Moreover, the photopolymerizable monomer may include a variety of materials. For example, the photopolymerizable monomer may include at least one of methyl methacrylate, styrene, and cyclohexyl methacrylate. Further, the crosslinker may include a variety of materials. For example, the crosslinker may include difunctional polymerizable groups (e.g., ethylene dimethacrylate). Further still, the photoinitiator may include a variety of materials. For example, the photoinitiatior may include 2,2-Dimethoxy-2-phenylacetophenone.

FIG. 4b illustrates forming a metal layer 404 on the structure 304 to provide a partially-fabricated device 400b. For purposes of explanation, only a portion of the structure 304 is shown in FIGS. 4b-d. As shown in FIG. 4b, the structure 304 includes the polymer 306. The metal layer may include a variety of conductive metals. For example, the metal layer may include one or more layers of gold. In addition, the metal layer may be formed in a variety of ways. As one example, the metal layer may be formed by a microfabrication process such as sputtering. However, in other examples, the metal layer may be formed by another microfabrication process such as evaporation.

FIG. 4c illustrates dispensing the mixture 402 onto the metal layer 404 to provide a partially fabricated device 400c. The mixture 402 may be dispensed onto the metal layer 404 in a variety of ways. For example, dispensing the mixture 402 onto the metal layer 404 may involve printing the mixture 402 onto the metal layer 404. As another example, dispending the mixture 402 onto the metal layer 404 may involve injecting the mixture 402 onto the metal layer 404.

FIG. 4d illustrates curing the mixture 402 on the metal layer 404 to form a crosslinked polymer layer 406 to provide a partially-fabricated device 400d. With this arrangement, the crosslinked polymer layer 406 and the metal layer 404 may define the electrode 408. In some examples, in the crosslinked polymer layer 408, at least a portion of the metal powder is entrapped.

The mixture 402 may be cured in a variety of ways. As one example, the mixture 402 may be cured with ultraviolet light. As another example, the mixture 402 may be cured with heat.

In FIG. 3, the first electrode 302, the circuit 308, and the sensor 310, are each depicted as located on a surface (e.g., a top or bottom surface) of the polymer 306. Similarly, in FIG. 4, the electrode 408 is depicted as located on a surface (e.g., a top or bottom surface) of the polymer 306. However, in other examples, one or more components may be embedded in a polymer of the structure 304 or surrounded by the polymer 306, except for being exposed by an opening.

Figure 5:
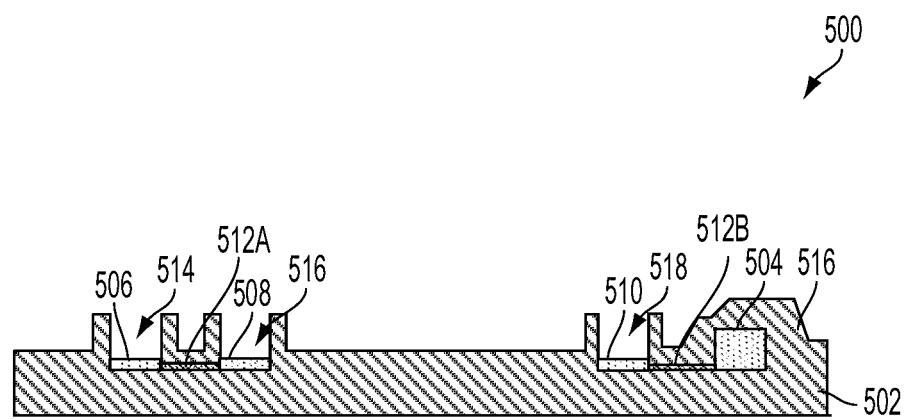
FIG. 5 depicts an example structure, according to an example embodiment.

FIG. 5 illustrates an example structure 500, according to an example embodiment. The structure 500 includes a polymer 502, a circuit 504, a first electrode 506, a second electrode 508, a sensor 510, electrical interconnects 512A, 512B, a first opening 514, a second opening 516, and a third opening 518.

The polymer 502 may take the form of or be similar in form to the polymer 306, the circuit 504 may take the form of or be similar in form to the circuit 308, the first electrode 506 may take the form of or be similar in form to the first electrode 302, the second electrode 312 may take the form of or be similar in form to the second electrode 314, the sensor 510 may take the form of or be similar in form to the sensor 310, and electrical interconnects 512A, 512B may take the form of or be similar in form to electrical interconnects 312A, 312B.

As shown in FIG. 5, the circuit 504 may be embedded in the polymer 502; the first electrode 506 may be surrounded by the polymer 502, except for the first electrode 506 being exposed by the first opening 514; the second electrode 508 may be surrounded by the polymer 502, except for the second electrode 508 being exposed by the second opening 516; and the sensor 510 may be surrounded by the polymer 502, except for the sensor 510 being exposed by the third opening 518.

In some examples, the polymer 502 may include a first polymer layer and a second polymer layer. In some such examples, the first polymer layer may be formed on the structure 500 before the circuit 504, the first electrode 506, the second electrode 508, and the sensor 510 are each located on the structure 500. Further, in some such examples, the second polymer layer may be formed over the first polymer layer, the circuit 504, the first electrode 506, the second electrode 508, and the sensor 510, and the electrical interconnects 512A, 512B. Further still, in some such examples, the first opening 514, the second opening 516, and the third opening 518 may be formed after or while the second polymer layer is being formed.

The first opening 514 may be formed in a variety of ways. As one example, the first opening 514 may be formed by removing material from the second polymer layer. The material from the second polymer layer may be removed to form the first opening 514 in a variety of ways. For instance, the material from the second polymer layer may be removed to form the first opening 514 via process that includes drilling, ablation, etching, etc.

As another example, a mask layer may be formed over the first electrode 506 before forming the second polymer layer over the first electrode. With this arrangement, the second polymer layer may mold over the mask layer. Further, in such an example, the mask layer may be removed to form the first opening 514 to the first electrode 506. The mask layer may be removed in a variety of ways. For instance, the mask layer may be removed via a process that includes etching the mask layer, dissolving the mask layer in a fluid, and/or soaking the mask layer in a fluid.

Similarly, the second opening 516 and the third opening 518 may be formed in a variety of ways. The second opening 516 and the third opening 518 may each be formed by any of the techniques that may be used to form the first opening 514 as described herein. In some examples, the second opening 516 and/or the third opening 518 may be formed by the same or similar technique that may be used to form the first opening 514. However, in other examples, the second opening 516 and/or the third opening 518 may be formed by a different technique than the technique that may be used to form the first opening 514.

Figure 6:
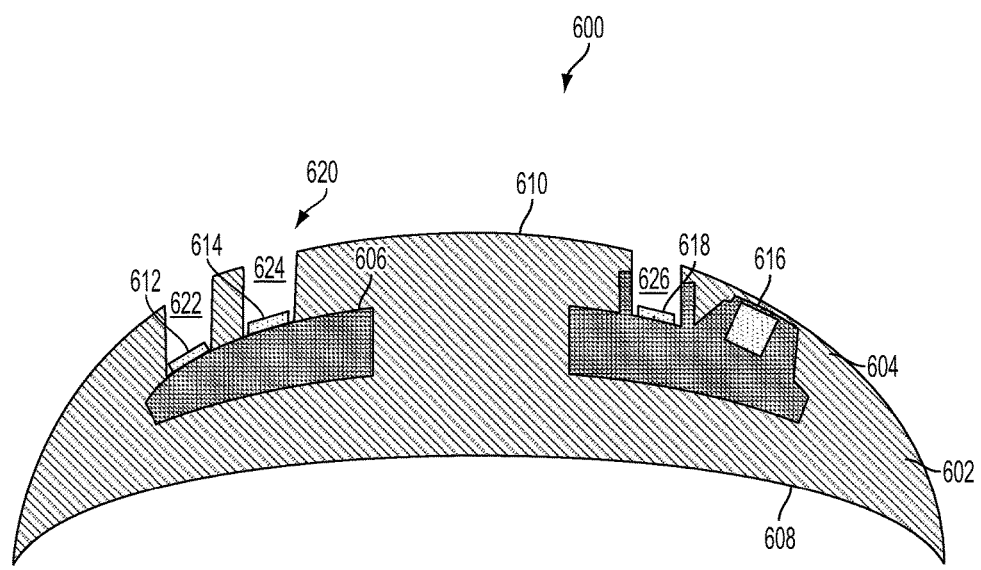
FIG. 6 depicts an example body-mountable device, according to an example embodiment.

As noted, FIG. 6 illustrates the body-mountable device 600 fabricated according to an example embodiment. The body-mountable device 600 may include a first polymer layer 602, a second polymer 604, and a structure 606 between the first polymer layer 602 and the second polymer layer 604. As shown in FIG. 6, the structure 606 may be a ring-shaped substrate. The first polymer layer 602 may define a first side 608 of the body-mountable device 600, and the second polymer layer 604 may define a second side 610 of the body-mountable device.

The first polymer layer 602 and the second polymer layer 604 may take the form of or be similar in form to the polymer 316, and the structure 606 may take the form of or be similar in form to the structure 304.

The structure 606 may include a first electrode 612, a second electrode 614, a circuit 616, and a sensor 618. The first electrode 612 may define an anode of a battery 620, and the second electrode 614 may define a cathode of the battery 620 and may be configured to reduce oxygen. The battery 620 may be configured to provide electrical power to the circuit 616.

The first electrode 612 may take the form of or be similar in form to the first electrode 302 and/or the electrode 408, the second electrode 614 may take the form of or be similar in form to the second electrode 314, the circuit 616 may take the form of or be similar in form to the circuit 308, the sensor 618 may take the form of or be similar in form to the sensor 310, and the battery 620 may take the form of or be similar in form to the battery 318.

For instance, in some examples, the first electrode 612 may include at least one metal selected from the group consisting of zinc, iron, aluminum, an alloy that includes zinc and magnesium, an alloy that includes iron and magnesium, and an alloy that includes aluminum and magnesium. Further, in some examples, the second electrode 614 may include platinum.

The body-mountable device 600 may further include a first channel 622 to the first electrode 612 through the first polymer layer 602 or the second polymer layer 604 and a second channel 624 to the second electrode 614 through the first polymer layer 602 or the second polymer layer 604. In the illustrated example, the first channel 622 to the first electrode 612 is through the second polymer layer 604 and the second channel 624 to the second electrode 614 is through the second polymer layer 604. However, in other examples, the first channel 622 to the first electrode 612 may be through the first polymer layer 602 and/or the second channel 624 to the second electrode 614 may be through the first polymer layer 602.

The first electrode 612 may be configured to use as an electrolyte fluid that contacts the first electrode 612 via the first channel 622, and the second electrode 614 may be configured to use an electrolyte fluid that contacts the second electrode 614 via the second channel 624. And in some such examples, at least one of the first polymer layer 602 or the second polymer layer 604 may include a silicone elastomer. With this arrangement, the battery 620 may include the first electrode 612, the second electrode 614, and the fluid that contacts the first electrode 612 via the first channel 622 and the second electrode 614 via the second channel 624.

The first electrode 612 may be configured to use as an electrolyte any bodily fluid of a wearer of the body-mountable device 600 that contacts the first electrode 612 via the first channel 622, and the second electrode 614 may be configured to use as an electrolyte any bodily fluid of the wearer of the body-mountable device that contacts the second electrode 614 via the second channel 624. For example, when the body-mountable device 600 comprises an eye-mountable device, the first electrode 612 may be configured to use as an electrolyte tear fluid that contacts the first electrode 612 via the first channel 622, and the second electrode 614 may be configured to use as an electrolyte tear fluid that contacts the second electrode 614 via the second channel 624. As another example, when the body-mountable device 600 comprises a tooth-mountable device, the first electrode 612 may be configured to use as an electrolyte saliva that contacts the first electrode 612 via the first channel 622, and the second electrode 614 may be configured to use as an electrolyte saliva that contacts the second electrode 614 via the second channel 624. As yet another example, when the body-mountable device 600 comprises a skin-mountable device, the first electrode 612 may be configured to use as an electrolyte blood that contacts the first electrode 612 via the first channel 622, and the second electrode 614 may be configured to use as an electrolyte blood that contacts the second electrode 614 via the second channel 624.

The first channel 622 to the first electrode 612 may take the form of or be similar in form to the first channel 320 to the first electrode 302, and the second channel 624 to the second electrode 614 may take the form of or be similar in form to the second channel 322 to the second electrode 312.

The location of the first channel 622 may be based on a location of the first electrode 612 on the structure 606. As one example, when the first electrode 612 is formed on a surface of the structure 606 that is facing the first side 608 of the body-mountable device 600, the first channel 622 may be located through the first polymer layer 602. As another example, when the first electrode 612 is formed on a surface of the structure 606 that is facing the second side 610 of the body-mountable device 600, the first channel 622 may be located through the second polymer layer 604.

Similarly, the location of the second channel 624 may be based on a location of the second electrode 614 on the structure 606. As one example, when the second electrode 614 is formed on a surface of the structure 606 that is facing the first side 608 of the body-mountable device 600, the second channel 624 may be located through the first polymer layer 602. As another example, when the second electrode 614 is formed on a surface of the structure 606 that is facing the second side 610 of the body-mountable device 600, the second channel 624 may be located through the second polymer layer 604.

Moreover, in some examples, the first polymer layer 602 or the second polymer layer 604 may have one channel to the first electrode 612 and the second electrode 614. Further, in some such examples, a dimension of the one channel may be greater than or equal to a sum of a corresponding dimension of the first channel 622 and a corresponding dimension of the second channel 624.

The material of the first polymer layer 602 and/or the second polymer layer 604 may be selected based on the location of the first channel 622 and/or the second channel 624. As one example, when the first channel 622 or the second channel 624 is through the first polymer layer 602, the first polymer layer 602 may include a silicone elastomer. As another example, when the first channel 622 or the second channel 624 is through the first polymer layer 604, the second polymer layer 604 may include a silicone elastomer.

Further, in some examples, the first electrode 612 and the second electrode 614 may each be configured to use as an electrolyte fluid that has diffused into the first polymer layer 602 or the second polymer layer 604. And in some such examples, at least one of the first polymer layer 602 or the second polymer layer 604 may include a silicone hydrogel or polyhydroxyethylmethacrylate. With this arrangement, the battery 620 may include the first electrode 612, the second electrode 614, and the fluid that has diffused into the first polymer layer 602 or the second polymer layer 604. Accordingly, with this arrangement, the body-mountable device 600 might not include the first channel 622 and/or the second channel 624.

The first electrode 612 and the second electrode 614 may each be configured to use as an electrolyte any bodily fluid of a wearer of the body-mountable device 600 that has diffused into the first polymer layer 602 or the second polymer layer 604. For example, when the body-mountable device 600 comprises an eye-mountable device, the first electrode 612 and the second electrode 614 may each be configured to use as an electrolyte tear fluid that has diffused into the first polymer layer 602 or the second polymer layer 604. As another example, when the body-mountable device 600 comprises a tooth-mountable device, the first electrode 612 and the second electrode 614 may each be configured to use as an electrolyte saliva that has diffused into the first polymer layer 602 or the second polymer layer 604. As yet another example, when the body-mountable device 600 comprises a skin-mountable device, the first electrode 612 and the second electrode 614 may each be configured to use as an electrolyte blood that has diffused into the first polymer layer 602 or the second polymer layer 604.

Further still, in some examples, the material of the first polymer layer 602 and/or the second polymer layer 604 may be based on a location of the first electrode 612 on the structure and/or a location of the second electrode 614 on the structure 606. As one example, when the first electrode 612 and/or the second electrode 614 is formed on a surface of the structure 606 that is facing the first side 608 of the body-mountable device 600, the first polymer layer 602 may include a silicone hydrogel or polyhydroxyethylmethacrylate. As another example, when the first electrode 612 and/or the second electrode 614 is formed on a surface of the structure 606 that is facing the second side 610 of the body-mountable device 600, the second polymer layer 604 may include a silicone hydrogel or polyhydroxyethylmethacrylate.

Moreover, in some examples, the first electrode 612 may be configured to use as an electrolyte fluid that has diffused into the first polymer layer 602 or the second polymer layer 604, and the second electrode 614 may be configured to use as an electrolyte fluid that contacts the second electrode 614 via the second channel 624. With this arrangement, the battery 620 may include the first electrode 612, the second electrode 614, the fluid that has diffused into the first polymer layer 602 or the second polymer layer 604, and the fluid that contacts the second electrode 614 via the second channel 624. Accordingly, with this arrangement, the body-mountable device 600 might not include the first channel 622.

Further, in some examples, the first electrode 612 may be configured to use as an electrolyte fluid that contacts the first electrode 612 via the first channel 622, and the second electrode 614 may be configured to use as an electrolyte fluid that has diffused into the first polymer layer 602 or the second polymer layer 604. With this arrangement, the battery 620 may include the first electrode 612, the second electrode 614, the fluid that contacts the first electrode 612 via the first channel 622, and the fluid that has diffused into the first polymer layer 602 or the second polymer layer 604. Accordingly, with this arrangement, the body-mountable device 600 might not include the second channel 624.

In another aspect, in the illustrated example, the second polymer layer 604 further includes a channel 626 to the sensor 618. With this arrangement, the sensor 618 may receive an analyte via the channel 626.

As noted, the battery 620 may be configured to provide electrical power to the circuit 616. With this arrangement, the battery 620 may permit autonomous operation of the body-mountable device 600. For example, the battery 620 may bias the sensor 618, via a potentiostat, so that electrodes in the sensor 618 are at appropriate potentials for analyte measurement. The battery 620 may provide electrical power to other interfaces for the sensor 618 as well. As another example, the battery 620 may power a memory in the circuit 618, for data logging of sensor readings from the sensor 618.

The battery 620 may also be configured to provide electrical power to a variety of other circuits that may be located on the structure 606, such as a computation circuit, a communication circuit, and/or a display circuit. Further, in some examples, the battery 620 may be configured to provide electrical power to one or more low-power circuits.

In addition, the battery 620 may also be configured to provide electrical power to other components located on the structure 606. As one example, the battery 620 may be configured to provide electrical power to one or more indicators located on the structure, such as a pixel array. With this arrangement, the one or more indicators may be configured to provide feedback to a wearer of the body-mountable device. As another example, the battery 620 may be configured to provide electrical power to a camera and/or a video camera that may be located on the structure 606. Further, in some examples, the battery 620 may be configured to provide electrical power to one or more peripheral components.

In some examples, the battery 620 may be configured to be recharged by an antenna located on the structure 606. For instance, the battery 620 may be configured to be recharged by radio frequency radiation harvested by the antenna. With this arrangement, the battery 620 may be wirelessly recharged.

Although the battery 620 is described above as including the first electrode 612 and the second electrode 614, in other examples a battery used in the body-mountable device 600 may include a solid-state device. And in some such examples, the battery may include anode that includes lithium.

Further, in some such examples, the battery may be mounted to the structure 606. For instance, the battery may be flip-chip bonded to the structure 606 using anisotropic conductive paste (ACP). In an example where the battery includes a solid-state device, the battery may be mounted to the structure 606 before, after, or while the circuit 616 may be mounted to the structure 606.

Such a battery may be configured to provide electrical power provide electrical power to the circuit 616. With this arrangement, the battery may permit autonomous operation of the body-mountable device 600. For example, the battery may bias the sensor 618, via a potentiostat, so that electrodes in the sensor 618 are at appropriate potentials for analyte measurement. The battery may provide electrical power to other interfaces for the sensor 618 as well. As another example, the battery may power a memory in the circuit 618, for data logging of sensor readings from the sensor 618.

The battery may also be configured to provide electrical power to a variety of other circuits that may be located on the structure 606, such as a computation circuit, a communication circuit, and/or a display circuit. Further, in some examples, the battery may be configured to provide electrical power to one or more low-power circuits.

In addition, the battery may also be configured to provide electrical power to other components located on the structure 606. As one example, the battery may be configured to provide electrical power to one or more indicators located on the structure, such as a pixel array. With this arrangement, the one or more indicators may be configured to provide feedback to a wearer of the body-mountable device. As another example, the battery may be configured to provide electrical power to a camera and/or a video camera that may be located on the structure 606. Further, in some examples, the battery may be configured to provide electrical power to one or more peripheral components.

In some examples, the battery may be configured to be recharged by an antenna located on the structure 606. For instance, the battery may be configured to be recharged by radio frequency radiation harvested by the antenna. With this arrangement, the battery may be wirelessly recharged.

Further, although the battery 620 has been described as included in the body-mountable device 600, in other examples the battery 620 may be included in other devices. For example, the battery 620 may be included in an implantable device that may be implanted, for example, in the human body. Such implantable devices may take the form of or be similar in form to the body-mountable device 600. As another example, the battery 620 may be included in a device that may not be mounted on a wearer or implanted in the wearer. Such devices may be take the form of or be similar in form to the body-mountable device 600.

Figure 7:
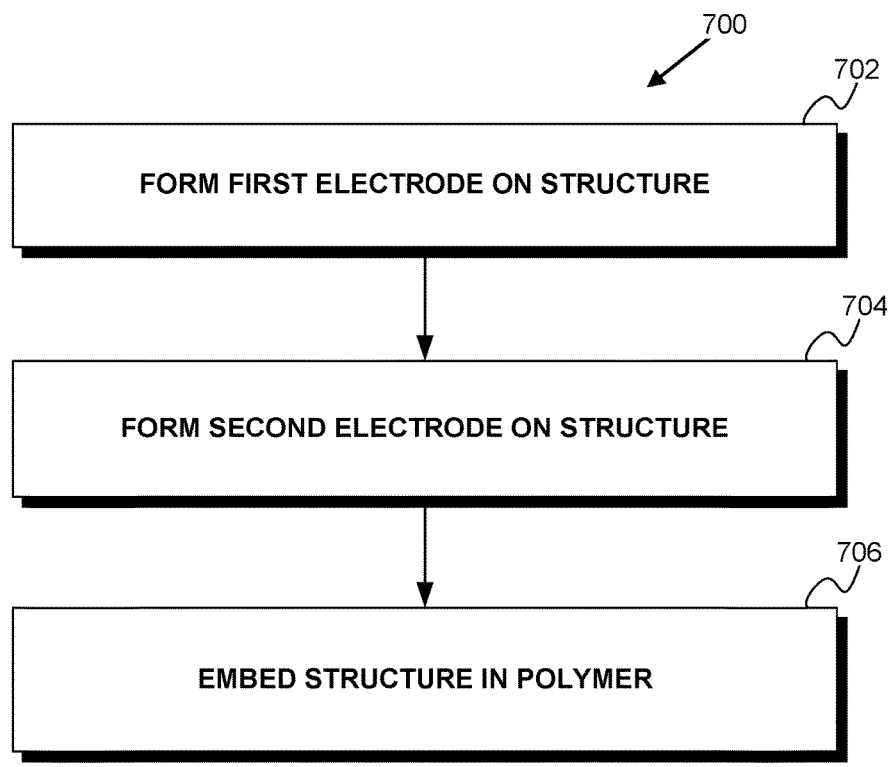
FIG. 7 is a flow chart illustrating a method for fabricating a battery, according to an example embodiment.

FIG. 7 is a flowchart of a method 700 for fabricating a battery, according to an example embodiment. The method 700 may involve forming a first electrode on a structure (block 702). The first electrode may define an anode of a battery. Further, the battery may be configured to provide electrical power to a circuit located on the structure.

The first electrode may take the form of or be similar in form the first electrode 302, the structure may take the form of or be similar in form to the structure 304 or the structure 500, and the battery may take the form of or be similar in form to the battery 318. For instance, in some embodiments, the first electrode may include at least one metal selected from the group consisting of zinc, iron, aluminum, an alloy that includes zinc and magnesium, an alloy that includes iron and magnesium, and an alloy that includes aluminum and magnesium. Further, the first electrode may be formed the same or similar way as the first electrode 302 may be formed as described with reference to FIG. 3*a*.

The method 700 may involve forming a second electrode on the structure (block 704). The second electrode may define a cathode of the battery. Further, the second electrode may be configured to reduce oxygen.

The second electrode may take the form of or be similar in form to the second electrode 314. For instance, in some embodiments, the second electrode may include platinum. Further, the second electrode may be formed the same or similar way as the second electrode 314 may be formed as described with reference to FIG. 3*b*. For instance, in some embodiments, the second electrode may be formed by sputtering or evaporation.

The method 700 may involve embedding the structure in a polymer (block 706). The polymer may take the form of or be similar in form to the polymer 316. For instance, the polymer may include a silicone hydrogel, polyhydroxyethylmethacrylat, or a silicone elastomer. Further, the structure may be embedded in the polymer the same or similar way as the structure 304 is embedded in the polymer 316 as described with reference to FIG. 3*c*.

In some embodiments, the first electrode may be configured to use as an electrolyte fluid that contacts the first electrode via a first channel, and the second electrode may be configured to use as an electrolyte fluid that contacts the second electrode via a second channel. And in at least one such embodiment, the method 700 may further involve forming the first channel to the first electrode through the polymer, and forming the second channel to the second electrode through the polymer. Further, in at least one such embodiment, the polymer may include a silicone elastomer.

The first channel to the first electrode may take the form of or be similar in form to the first channel 320 to the first electrode 302, and the second channel to the second electrode may take the form of or be similar in form to the second channel 322 to the second electrode 314. Further, the first channel to the first electrode may be formed the same or similar way as the first channel 320 to the first electrode 302 may be formed as described with reference to FIG. 3*d*. Further still, the second channel the second electrode may be formed the same or similar way as the second channel 322 to the second electrode 314 may be formed as described with reference to FIG. 3*d*.

In some embodiments, the first and second electrodes may each be configured to use as an electrolyte fluid that has diffused into the polymer. And in at least one such embodiment, the polymer may include a silicone hydrogel or polyhydroxyethylmethacrylate.

Figure 8:
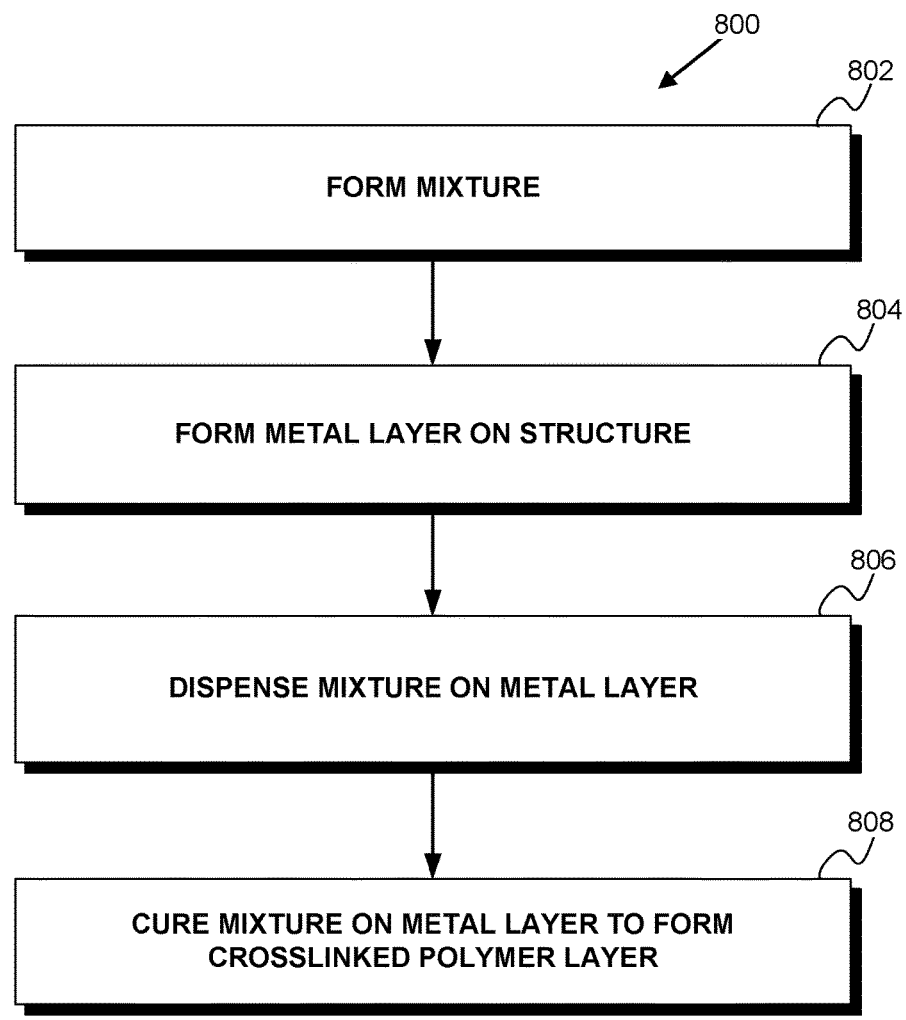
FIG. 8 is a flow chart illustrating a method for forming an electrode, according to an example embodiment.

FIG. 8 is a flowchart of a method 800 for fabricating an electrode, according to an example embodiment. The method 800 may be performed in connection with block 702 of method 700. The method 800 may involve forming a mixture (block 802). The mixture may include a metal powder, a photopolymerizable monomer, a crosslinker, and a photoinitiator. The mixture may take the form of or be similar in form to the mixture 402. For instance, in at least one embodiment, the mixture may comprise an ink. Further, the mixture may be formed the same or similar way as the mixture 402 may be formed as described with respect to FIG. 4*a*.

The method 800 may involve forming a metal layer on the structure (block 804). The metal layer may take the form of or be similar in form to the metal layer 404, and the structure may take the form of or be similar in form to the structure 304. Further, the metal layer may be formed on the structure the same or similar way as the metal layer 404 may be formed on the structure 304 as described with reference to FIG. 4b.

The method 800 may involve dispensing the mixture onto the metal layer (block 806). The mixture may be dispensed onto the metal layer the same or similar was as the mixture 402 may be dispensed onto the metal layer 404 as described with reference to FIG. 4c. For instance, in at least one embodiment, dispensing the mixture onto the metal layer may involve printing the mixture onto the metal layer.

The method 800 may involve curing the mixture on the metal layer to form a crosslinked polymer layer (block 806). In the crosslinked polymer layer, at least a portion of the metal powder may be entrapped. The crosslinked polymer layer may take the form of or be similar in form to the crosslinked polymer layer 406. Further, the mixture may be cured to form the crosslinked polymer layer the same or similar way as the mixture 402 may be cured to form the crosslinked polymer layer 406 as described with reference to FIG. 4d.

Figure 9:
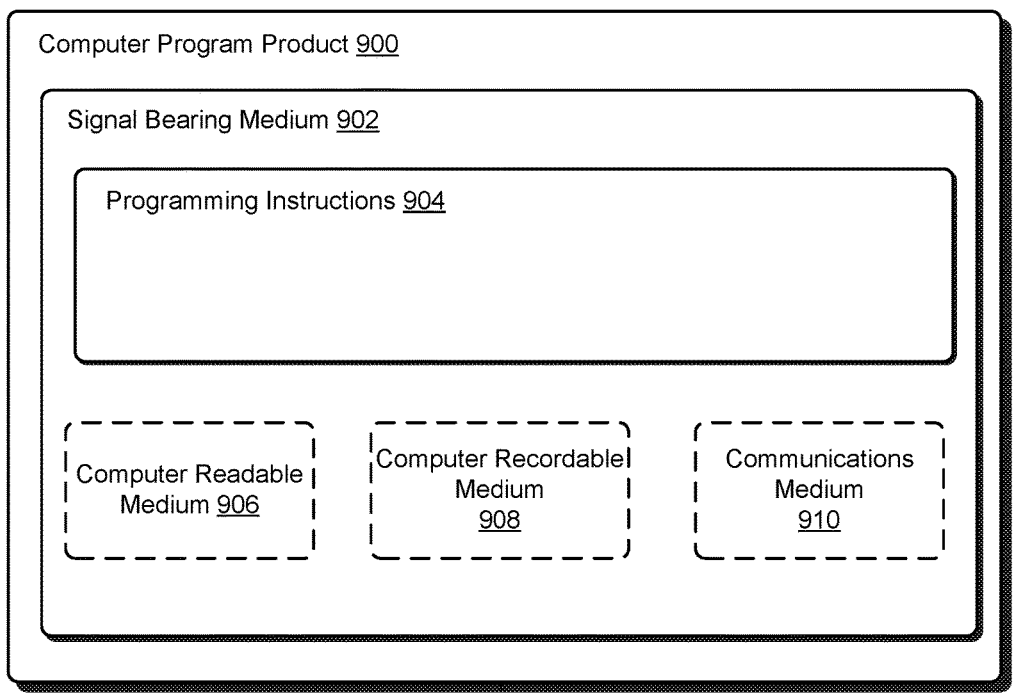
FIG. 9 depicts a computer-readable medium configured according to an example embodiment.

FIG. 9 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause a system to carry out the various functions, tasks, capabilities, etc., described above.

In some embodiments, the disclosed techniques can be implemented by computer program instructions encoded on a non-transitory computer-readable storage media in a machine-readable format, or on other non-transitory media or articles of manufacture. FIG. 9 is a schematic illustrating a conceptual partial view of a computer program product 900 that includes a computer program for executing a computer process on a computing device, to perform any of the methods described herein.

In one embodiment, the computer program product 900 is provided using a signal bearing medium 902. The signal bearing medium 902 may include one or more programming instructions 904 that, when executed by one or more processors may provide functionality or portions of the functionality described above with respect to FIGS. 7-8. In some examples, the signal bearing medium 902 can include a non-transitory computer-readable medium 906, such as, but not limited to, a hard disk drive, a Compact Disc (CD), a Digital Video Disk (DVD), a digital tape, memory, etc. In some implementations, the signal bearing medium 902 can be a computer recordable medium 908, such as, but not limited to, memory, read/write (R/W) CDs, R/W DVDs, etc. In some implementations, the signal bearing medium 902 can be a communications medium 910, such as, but not limited to, a digital and/or an analog communication medium (e.g., a fiber optic cable, a waveguide, a wired communications link, a wireless communication link, etc.). Thus, for example, the signal bearing medium 902 can be conveyed by a wireless form of the communications medium 910.

The one or more programming instructions 904 can be, for example, computer executable and/or logic implemented instructions. In some examples, a computing device is configured to provide various operations, functions, or actions in response to the programming instructions 904 conveyed to the computing device by one or more of the computer readable medium 906, the computer recordable medium 908, and/or the communications medium 910.

The non-transitory computer readable medium 906 can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

IV. CONCLUSION

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:
1. A method comprising:
   forming a first electrode on a structure, wherein the first electrode defines an anode of a battery that uses bodily fluid as an electrolyte;
   forming a second electrode on the structure, wherein the second electrode defines a cathode of the battery, and wherein the second electrode reduces oxygen; and embedding the structure in a polymer, wherein the polymer defines a first side and a second side of a body-mountable device.

2. The method of claim 1, wherein the bodily fluid is able to contact the first and second electrodes by diffusion through the polymer.

3. The method of claim 2, wherein the polymer comprises a silicone hydrogel or polyhydroxyethylmethacrylate.

4. The method of claim 1, wherein the method further comprises:
forming a first channel to the first electrode through the polymer, wherein the bodily fluid is able to contact the first electrode via the first channel; and
forming a second channel to the second electrode through the polymer, wherein the bodily fluid is able to contact the second electrode via the second channel.

5. The method of claim 4, wherein the polymer comprises a silicone elastomer.

6. The method of claim 1, wherein the first electrode comprises at least one metal selected from the group consisting of zinc, iron, aluminum, an alloy that includes zinc and magnesium, an alloy that includes iron and magnesium, and an alloy that includes aluminum and magnesium.

7. The method of claim 1, wherein the second electrode comprises platinum.

8. The method of claim 1, wherein forming the first electrode comprises:
forming a mixture that comprises a metal powder, a photopolymerizable monomer, a crosslinker, and a photoinitiator;
forming a metal layer on the structure;
dispensing the mixture onto the metal layer; and
curing the mixture on the metal layer to form a crosslinked polymer layer in which at least a portion of the metal powder is entrapped.

9. The method of claim 8, wherein the mixture comprises an ink.

10. The method of claim 8, wherein dispensing the mixture onto the metal layer comprises printing the mixture onto the metal layer.

11. The method of claim 1, wherein forming the second electrode comprises forming the second electrode by sputtering or evaporation.

12. The method of claim 1, wherein the battery produces at least one reaction product, and wherein the at least one reaction product is insoluble under physiological pH, such that the at least one reaction product does not disperse into the bodily fluid.

13. A body-mountable device comprising:
a first polymer layer defining a first side of the body-mountable device;
a second polymer layer defining a second side of the body-mountable device; and
a structure between the first and second polymer layers, wherein the structure comprises:
a first electrode, wherein the first electrode defines an anode of a battery that uses bodily fluid as an electrolyte, and
a second electrode, wherein the second electrode defines a cathode of the battery, and wherein the second electrode reduces oxygen.

14. The body-mountable device of claim 13, wherein the bodily fluid is able to contact the first and second electrodes by diffusion through the first polymer layer or the second polymer layer.

15. The body-mountable device of claim 13, wherein the first polymer layer or the second polymer layer comprises a silicone hydrogel or polyhydroxyethylmethacrylate.

16. The body-mountable device of claim 13 further comprising:
a first channel to the first electrode through the first polymer layer or second polymer layer, wherein the bodily fluid is able to contact the first electrode via the first channel; and
a second channel to the second electrode through the first polymer layer or second polymer layer, wherein the bodily fluid is able to contact the second electrode via the second channel.

17. The body-mountable device of claim 13, wherein the first polymer layer or the second polymer layer comprises a silicone elastomer.

18. The body-mountable device of claim 13, wherein the first electrode comprises at least one metal selected from the group consisting of zinc, iron, aluminum, an alloy that includes zinc and magnesium, an alloy that includes iron and magnesium, and an alloy that includes aluminum and magnesium.

19. The body-mountable device of claim 13, wherein the second electrode comprises platinum.

20. The body-mountable device of claim 13, wherein the battery produces at least one reaction product, and wherein the at least one reaction product is insoluble under physiological pH, such that the at least one reaction product does not disperse into the bodily fluid.

* * * * *